US011405522B2

(12) United States Patent
Kanemoto

(10) Patent No.: US 11,405,522 B2
(45) Date of Patent: Aug. 2, 2022

(54) INFORMATION PROCESSING APPARATUS AND INFORMATION PROCESSING METHOD

(71) Applicant: SONY CORPORATION, Tokyo (JP)

(72) Inventor: Katsuyoshi Kanemoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 212 days.

(21) Appl. No.: 16/497,139

(22) PCT Filed: Apr. 13, 2018

(86) PCT No.: PCT/JP2018/015469
§ 371 (c)(1),
(2) Date: Sep. 24, 2019

(87) PCT Pub. No.: WO2018/198812
PCT Pub. Date: Nov. 1, 2018

(65) Prior Publication Data

US 2021/0127031 A1 Apr. 29, 2021

(30) Foreign Application Priority Data

Apr. 27, 2017 (JP) ............................. JP2017-088347

(51) Int. Cl.
*H04N 1/32* (2006.01)
*G06Q 10/06* (2012.01)
(Continued)

(52) U.S. Cl.
CPC ... *H04N 1/32496* (2013.01); *G06Q 10/06311* (2013.01); *G10L 15/22* (2013.01); *G10L 25/84* (2013.01); *G10L 2015/223* (2013.01)

(58) Field of Classification Search
None
See application file for complete search history.

(56) References Cited

U.S. PATENT DOCUMENTS 5,008,941 A * 4/1991 Sejnoha .................. G10L 15/07 704/251
5,247,580 A * 9/1993 Kimura ................ H04B 10/114 704/E15.045

(Continued)

FOREIGN PATENT DOCUMENTS

JP 2005-148724 A 6/2005
JP 2005-149480 A 6/2005

(Continued)

OTHER PUBLICATIONS

International Search Report and Written Opinion of PCT Application No. PCT/JP2018/015469, dated Jul. 17, 2018, 07 pages of ISRWO.

(Continued)

*Primary Examiner* — Jonathan C Kim
(74) *Attorney, Agent, or Firm* — Chip Law Group

(57) ABSTRACT

The present technology relates to an information processing device, and an information processing method, each of which enables to reduce a confirmation load put on a user before a task is executed. The information processing device according to one embodiment of the present technology has the feature of, on the basis of relationship between a first cost required in a case where execution of a predetermined task has been a mistake and a second cost that is allowed by a user for the predetermined task that has been executed by mistake, calculating a confirmation degree of confirming the user as to whether or not to execute the predetermined task, and performing the confirmation by contents corresponding to the calculated degree. The present technology can be applied to an agent apparatus that operates using a voice UI.

17 Claims, 16 Drawing Sheets

START TASK EXECUTION PROCESSING OF INFORMATION PROCESSING DEVICE
RECOGNIZE VOICE SPOKEN BY USER S1
PERFORM LANGUAGE ANALYSIS, AND IDENTIFY TASK TYPE AND EXECUTION TIME ARGUMENT S2
CALCULATE FALSE EXECUTION COST S3
DETECT CONTEXT S4
SET ALLOWABLE COST S5
CALCULATE CONFIRMATION DEGREE S6
IS CONFIRMATION REQUIRED? S7
YES
NO
PERFORM CONFIRMATION ACCORDING TO CONFIRMATION DEGREE S8
DETECT USER'S REACTION S9
UPDATE ALLOWABLE COST S10
HAS EXECUTION OF TASK BEEN PERMITTED? S11
NO
YES
EXECUTE TASK S12
END

(51) Int. Cl.
*G10L 15/22* (2006.01)
*G10L 25/84* (2013.01)

(56) References Cited

U.S. PATENT DOCUMENTS 6,347,315 B1* 2/2002 Kiyoki ................ G06F 16/2471 707/999.005
7,496,500 B2* 2/2009 Reed .................... G06Q 10/107 709/240
10,171,662 B1* 1/2019 Zhou ....................... G10L 25/63
10,446,137 B2* 10/2019 Khan ...................... G06F 40/30
2001/0056350 A1* 12/2001 Calderone ............... G10L 15/30 704/E15.047
2006/0167696 A1* 7/2006 Chaar ..................... G10L 15/22 704/E15.04
2006/0271364 A1* 11/2006 Mirkovic ................ G06F 40/40 704/E15.044
2007/0036289 A1* 2/2007 Fu ............................ G07C 9/37 704/E17.004
2008/0059195 A1* 3/2008 Brown .......................... 704/270
2008/0140400 A1* 6/2008 Blass ...................... G10L 15/22 704/E15.04
2012/0173244 A1* 7/2012 Kwak ..................... G10L 15/22 704/E15.001
2012/0253805 A1* 10/2012 Rajakumar ........ G06Q 20/4016 704/E15.001
2014/0195247 A1* 7/2014 Parkinson ............... G06F 3/167 704/275
2014/0278389 A1* 9/2014 Zurek ..................... G10L 15/20 704/231
2016/0063227 A1* 3/2016 Kobres ................... H04L 63/08 726/3
2016/0063471 A1* 3/2016 Kobres ................ G06Q 20/321 705/18
2016/0063503 A1* 3/2016 Kobres ................... G10L 17/00 705/18
2016/0063995 A1* 3/2016 Choi ....................... G10L 15/22 704/243
2016/0196499 A1* 7/2016 Khan ..................... G06N 5/048 706/52
2018/0068657 A1* 3/2018 Khan .................... G10L 15/063
2018/0114159 A1* 4/2018 Dubey .................... G06F 15/16
2018/0314689 A1* 11/2018 Wang .................. G10L 15/1822
2020/0211544 A1* 7/2020 Mikhailov .............. G10L 25/90
2020/0258077 A1* 8/2020 Wyllie ............. G06Q 20/40145
2021/0127031 A1* 4/2021 Kanemoto ......... H04N 1/32496

FOREIGN PATENT DOCUMENTS

JP 2005-149481 A 6/2005
JP 2006-139481 A 6/2006
JP 2017-037176 A 2/2017
WO 2017/026239 A1 2/2017

OTHER PUBLICATIONS

Office Action for JP Application Serial No. 2019-514382 dated Apr. 5, 2022.

* cited by examiner

FIG. 2

| TASK TYPE | EXECUTION TIME ARGUMENT |
| --- | --- |
| TRANSMIT E-MAIL | DESTINATION<br>CONTENTS |
| ADD TO To Do | CONTENTS<br>SCHEDULED DATE |
| ALLOCATE TAXI | WHERE<br>WHEN |
| CONTROL INDOOR AIR CONDITIONING | WHEN<br>TEMPERATURE |

FIG. 5

HIGH ↔ LOW

| CONFIRMATION DEGREE | INPUT REQUESTING METHOD | ATTENTION ATTRACTING METHOD |
|---|---|---|
| 4 | EXPLICITLY REQUEST USER TO SAY "TRANSMISSION" FOR CONFIRMATION SAYING | GENERATE LONGISH AUDIBLE VIBRATIONS, AND STRENGTHEN TONE OF VOICE |
| 3 | REQUEST USER TO PERFORM CONFIRMATION SAYING RELATED TO "TRANSMISSION", INCLUDING SYNONYMS SUCH AS "OK" AND "PLEASE TRANSMIT" | GENERATE SHORTISH AUDIBLE VIBRATIONS SEVERAL TIMES |
| 2 | IN CASE WHERE USER PERFORMS SAYING RELATED TO "CANCEL", INCLUDING SYNONYM SUCH AS "WAIT", EXECUTION OF TASK IS CANCELED | SAY COUNTDOWN SUCH AS "5, 4, ... 1" RELATIVELY SLOWLY. GENERATE SHORT AUDIBLE VIBRATIONS TWICE CONCURRENTLY WITH SAYING NUMBERS, AND EXECUTE TASK IF USER SAYS NOTHING DURING THIS TIME |
| 1 | ONLY IN CASE WHERE USER SAYS "CANCEL", EXECUTION OF TASK IS CANCELED | SAY COUNTDOWN SUCH AS "5, 4, ... 1" RELATIVELY QUICKLY. GENERATE SHORT AUDIBLE VIBRATIONS ONCE CONCURRENTLY WITH SAYING NUMBERS, AND EXECUTE TASK IF USER SAYS NOTHING DURING THIS TIME |
| 0 | (NOT REQUEST) | GENERATE SHORT AND WEAK AUDIBLE VIBRATIONS |

FIG. 8

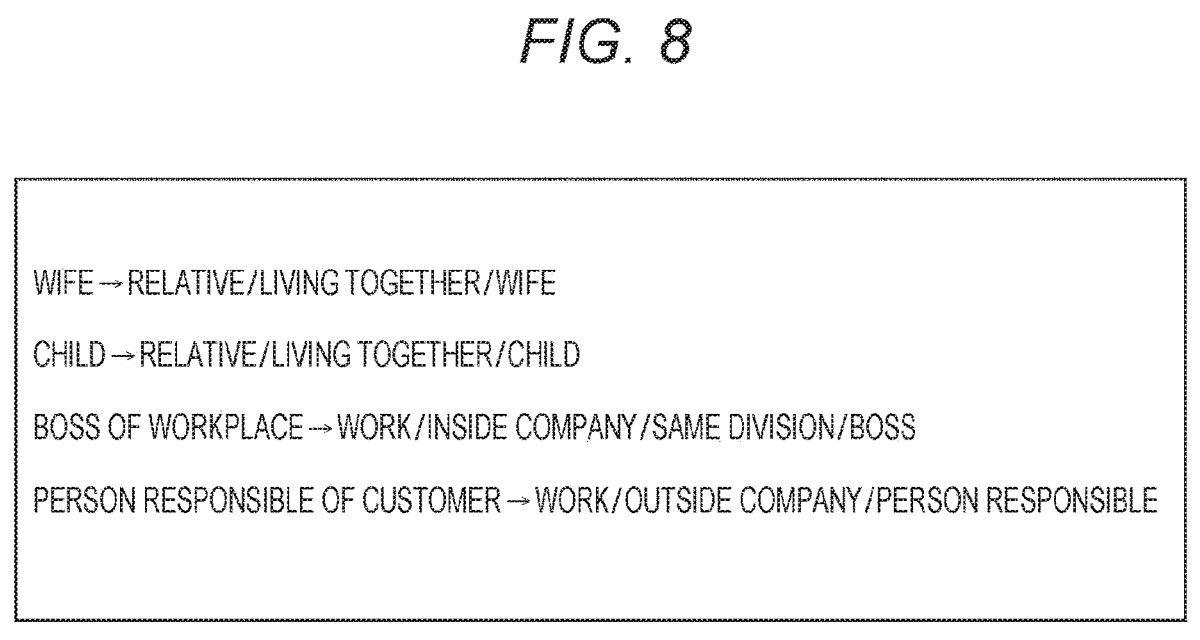

WIFE → RELATIVE/LIVING TOGETHER/WIFE

CHILD → RELATIVE/LIVING TOGETHER/CHILD

BOSS OF WORKPLACE → WORK/INSIDE COMPANY/SAME DIVISION/BOSS

PERSON RESPONSIBLE OF CUSTOMER → WORK/OUTSIDE COMPANY/PERSON RESPONSIBLE

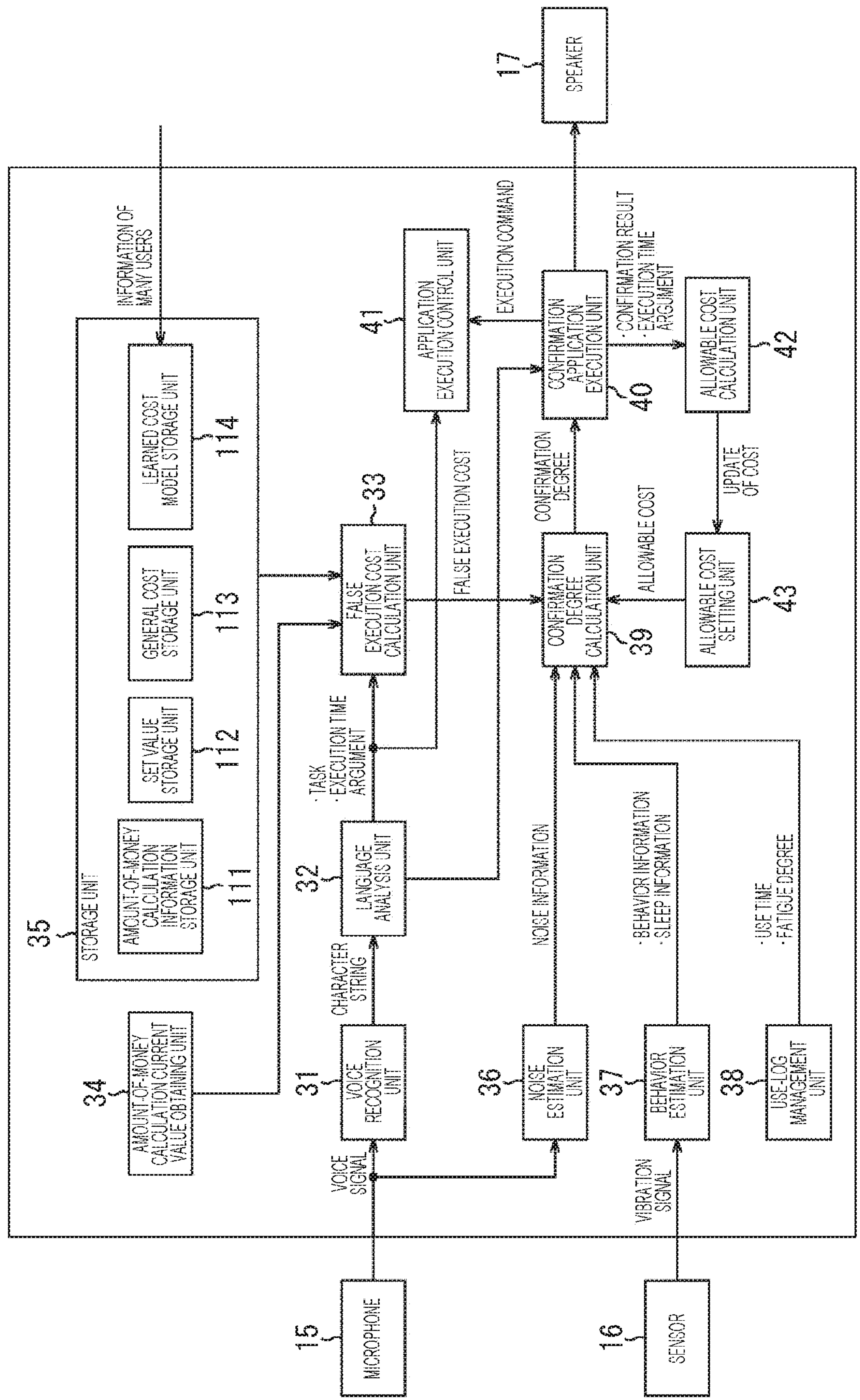
FIG. 11
15
MICROPHONE
16
SENSOR
17
SPEAKER
VOICE SIGNAL
VIBRATION SIGNAL
34
AMOUNT-OF-MONEY CALCULATION CURRENT VALUE OBTAINING UNIT
35
STORAGE UNIT
111
AMOUNT-OF-MONEY CALCULATION INFORMATION STORAGE UNIT
112
SET VALUE STORAGE UNIT
113
GENERAL COST STORAGE UNIT
114
LEARNED COST MODEL STORAGE UNIT
INFORMATION OF MANY USERS
31
VOICE RECOGNITION UNIT
CHARACTER STRING
32
LANGUAGE ANALYSIS UNIT
· TASK
· EXECUTION TIME ARGUMENT
33
FALSE EXECUTION COST CALCULATION UNIT
FALSE EXECUTION COST
41
APPLICATION EXECUTION CONTROL UNIT
EXECUTION COMMAND
36
NOISE ESTIMATION UNIT
NOISE INFORMATION
37
BEHAVIOR ESTIMATION UNIT
· BEHAVIOR INFORMATION
· SLEEP INFORMATION
38
USE-LOG MANAGEMENT UNIT
· USE TIME
· FATIGUE DEGREE
39
CONFIRMATION DEGREE CALCULATION UNIT
CONFIRMATION DEGREE
40
CONFIRMATION APPLICATION EXECUTION UNIT
· CONFIRMATION RESULT
· EXECUTION TIME ARGUMENT
42
ALLOWABLE COST CALCULATION UNIT
UPDATE OF COST
43
ALLOWABLE COST SETTING UNIT
ALLOWABLE COST D1
Web BROWSER
http://
EXECUTE
251
D2
252
IS XXX ALL RIGHT?
DO NOT CONFIRM FROM NEXT TIME
OK
262
261
D3
TASK HAS BEEN EXECUTED!

301
CPU
302
ROM
303
RAM
304
305
INPUT-OUTPUT INTERFACE
306
INPUT UNIT
307
OUTPUT UNIT
308
STORAGE UNIT
309
COMMUNICATION UNIT
310
DRIVE
311
REMOVABLE MEDIA

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/015469 filed on Apr. 13, 2018, which claims priority benefit of Japanese Patent Application No. JP 2017-088347 filed in the Japan Patent Office on Apr. 27, 2017. Each of the above-referenced applications is hereby incorporated herein by reference in its entirety.

TECHNICAL FIELD

The present technology relates to an information processing device, an information processing method, and a program, and in particular relates to an information processing device, an information processing method, and a program, each of which enables to reduce a confirmation load put on a user before a task is executed.

BACKGROUND ART

There are proposed various agent technologies each executing various tasks for supporting user's behavior according to operation using a voice UI. For example, there is an agent having a function of recognizing a voice spoken by a user, and adjusting a schedule.

CITATION LIST

Patent Document

Patent Document 1: Japanese Patent Application Laid-Open No. 2015-11651

SUMMARY OF THE INVENTION

Problems to be Solved by the Invention

Before a task is executed, for example, before a schedule is actually registered, or before an e-mail is actually transmitted according to input by a spoken voice, a user is usually requested to confirm whether or not to execute the task. In response to such confirmation, when the user makes a reaction of instructing execution of the task, the task is executed.

Similar confirmation is uniformly performed every time even for tasks that will cause no problem even if processing, the contents of which differ from intention of a user, is executed by mistake, and therefore execution of the tasks is complicated for the user.

The present technology has been devised in consideration of such a situation, and enables to reduce a confirmation load put on a user before a task is executed.

Solutions to Problems

An information processing device according to one aspect of the present technology includes: a confirmation degree calculation unit that, on the basis of relationship between a first cost required in a case where execution of a predetermined task has been a mistake and a second cost that is allowed by a user for the predetermined task that has been executed by mistake, calculates a confirmation degree of confirming the user as to whether or not to execute the predetermined task; and a confirmation control unit that performs the confirmation by contents corresponding to the degree.

The information processing device can further include a first cost calculation unit that calculates the first cost on the basis of a type of a task and arguments used when the task is executed.

The first cost calculation unit can be caused to calculate the first cost further on the basis of properties of the user.

The first cost calculation unit can be caused to calculate the first cost on the basis of similarity of a combination of a type of a task and arguments used when the task is executed, between the predetermined task and a task in which a reference cost is set beforehand.

The first cost calculation unit can be caused to calculate the first cost on the basis of tendencies of reactions by other two or more users to the confirmation.

The first cost calculation unit can be caused to calculate the first cost represented as amount-of-money information.

The first cost calculation unit can be caused to calculate the amount-of-money information required to change from a current situation to a situation obtained after the predetermined task has been executed.

The information processing device can further include a second cost calculation unit that calculates the second cost on the basis of a reaction of the user to the confirmation performed in the past.

The confirmation control unit can be caused to perform the confirmation by requesting the user to perform input that differs according to the degree.

The confirmation control unit can be caused to present, to the user, that the predetermined task is executed by a method that differs according to the degree.

The information processing device can further include a setting unit that sets an upper limit value of the second cost on a task type basis.

The confirmation degree calculation unit can be caused to adjust the degree according to an accuracy of input by the user.

The confirmation degree calculation unit can be caused to determine the accuracy according to a noise level.

The confirmation degree calculation unit can be caused to determine the accuracy according to a fatigue degree of the user.

The confirmation degree calculation unit can be caused to determine the accuracy according to behavior of the user.

In a case where the first cost exceeds the second cost by a threshold value or more, the confirmation control unit can be caused to stop execution of the predetermined task.

The confirmation control unit can be caused to present, to the user, having stopped the execution of the task together with a factor.

According to one aspect of the present technology, an information processing device has the feature of, on the basis of relationship between a first cost required in a case where execution of a predetermined task has been a mistake and a second cost that is allowed by a user for the predetermined task that has been executed by mistake, calculating a confirmation degree of confirming the user as to whether or not to execute the predetermined task, and performing the confirmation by contents corresponding to the degree.

Effects of the Invention

According to the present technology, a confirmation load put on a user before a task is executed can be reduced.

It should be noted that the effects described herein are not necessarily limited, and may be any one of the effects described in the present disclosure.

BRIEF DESCRIPTION OF DRAWINGS

FIG. 2 is a drawing illustrating an example of tasks;

FIG. 5 is a drawing illustrating an example of correspondence relationship between a confirmation degree and a task execution confirmation method;

FIG. 8 is a drawing illustrating an example of categorizing e-mail destinations;

FIG. 11 is a block diagram illustrating an example of a functional configuration of an information processing device;

MODE FOR CARRYING OUT THE INVENTION

Figure 1:
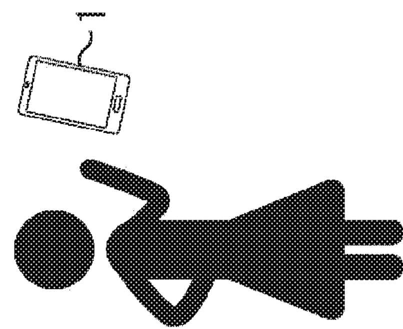
FIG. 1 is a drawing illustrating an example of using an information processing device according to one embodiment of the present technology.

Modes for carrying out the present technology will be described below. The description will be made in the following order.

1. Task execution in voice UI
2. Confirmation of task execution in voice UI
3. Relationship between task cost and user's allowance
4. Presentation method corresponding to confirmation degree
5. Automatic adjustment of allowable cost
6. False execution cost
7. Additional control by context such as operational environment
8. Stop of execution
9. Configuration example of information processing device
10. Operation of information processing device
11. Modified example <<Task Execution in Voice UI>>

FIG. 1 is a drawing illustrating an example of using an information processing device 1 according to one embodiment of the present technology.

The information processing device 1 is a mobile terminal that executes a predetermined program to perform various processing for supporting user's behavior, and that is equipped with what is called an agent function.

In the example of FIG. 1, the information processing device 1 is a smart phone. However, the information processing device 1 may be a mobile terminal having a display device, such as a tablet terminal and a watch type wearable terminal, or may be a mobile terminal that does not have a display device. The information processing device 1 may be a stationary device that is not portable.

The operation of the information processing device 1 is mainly performed by a voice User Interface (UI). The information processing device 1 is provided with a microphone for collecting a voice spoken by a user, and a speaker for presenting various information to the user by outputting a synthetic voice.

The voice operation enables the user to easily operate the information processing device 1 even if the user is working while using hands, for example, while cooking, or even if the user is carefully watching another object, for example, while reading a book. Meanwhile, in comparison with the operation using a screen UI, the voice operation requires, for example, the time for reading information aloud so as to inform the user of the information, and the time for waiting for the end of user's saying.

The user specifies, by voice, information corresponding to a task type and an execution time argument of a task, which causes the information processing device 1 to execute the task. Here, it is assumed that as shown in FIG. 2, the information processing device 1 is capable of executing tasks of respective task types of "transmit e-mail", "add to ToDo", "allocate taxi", and "control indoor air conditioning".

As shown in FIG. 2, in a case where an e-mail is transmitted, a destination and contents are specified by voice as execution time arguments. An application (mailer) that executes a task of "transmit e-mail" manages a plurality of e-mail addresses registered beforehand. The mailer sets a predetermined e-mail address as a destination, and transmits, to a mail server, an e-mail in which a main text contains contents specified by voice.

In the case of "add to ToDo", the contents and the scheduled date are specified by voice as execution time arguments. A ToDo application that executes a task of "add to ToDo" manages a ToDo list of the user. The ToDo application adds an item of the contents specified by voice as an item of the predetermined scheduled date of the ToDo list.

In the case of "allocate taxi", where a taxi is allocated, and when the taxi is allocated, are specified by voice as execution time arguments. A taxi allocation application that executes a task of allocating a taxi accesses a predetermined server, and transmits information related to the date and time and an allocation place, which have been specified by voice, thereby requesting taxi allocation.

In the case of "control indoor air conditioning", when air conditioning is controlled, and a specific temperature at which air conditioning is set, are specified by voice as execution time arguments. An air conditioning management application that executes a task of controlling indoor air conditioning performs wireless communication with an air conditioner, and transmits information related to the date and time and the temperature specified by voice, thereby adjusting air conditioning.

In this manner, the information processing device 1 is provided with the applications for executing the respective tasks, and hardware for connecting to the Internet through a wired or wireless network. The information processing device 1 can be provided with applications other than the applications for executing the tasks shown in FIG. 2.

<<Confirmation of Task Execution in Voice UI>>

When a task type and execution time arguments of a task are specified by voice, task execution confirmation is performed before the task as described above is executed. The task execution confirmation is processing of requesting the user to confirm whether or not to permit a task to be executed before the task is executed. The task execution confirmation, and user's inputting of permission/non-permission for the task execution confirmation as well, are performed by voice.

Figure 3:
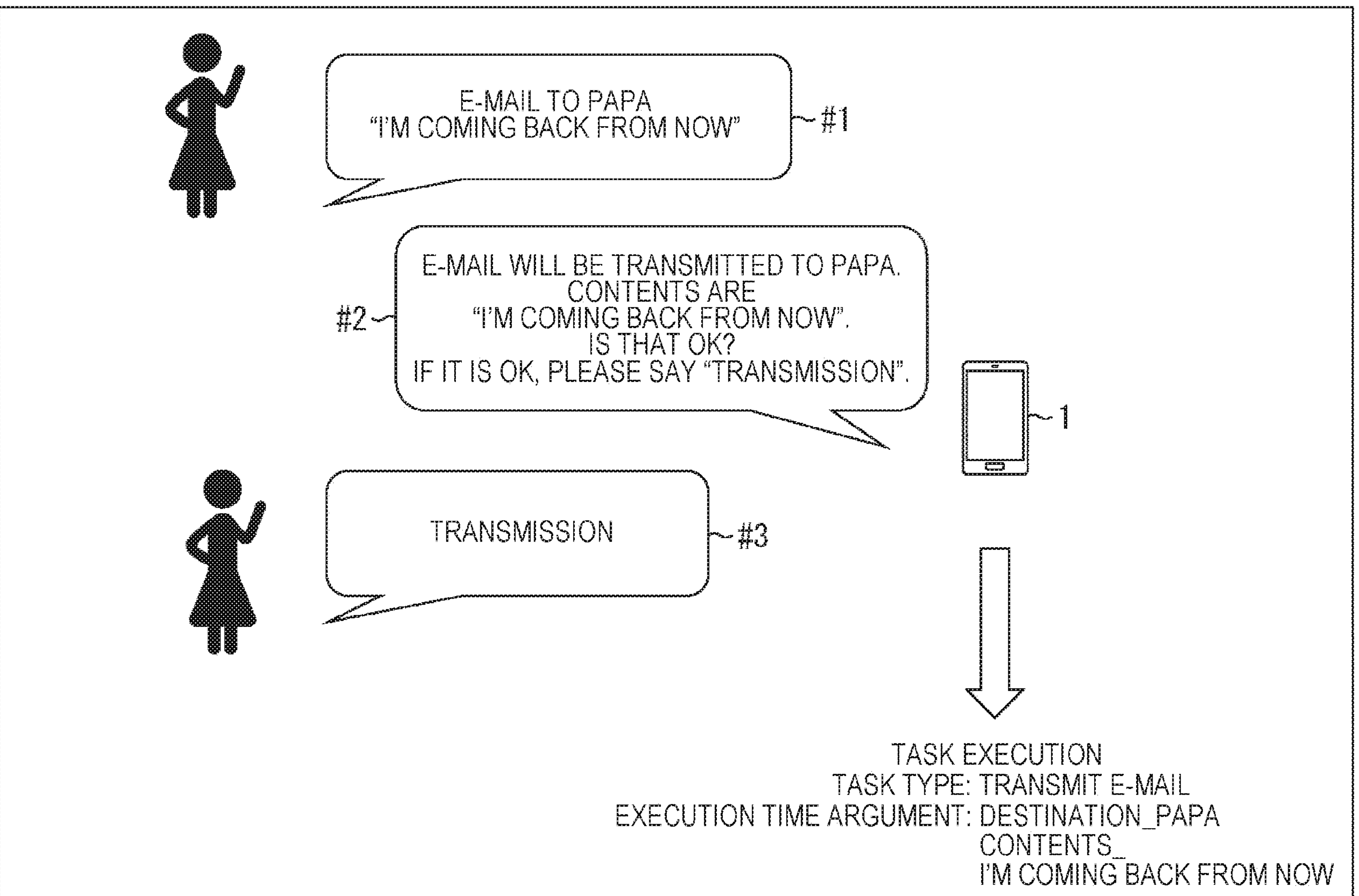
FIG. 3 is a drawing illustrating an example of a process flow before execution of a task.

FIG. 3 is a drawing illustrating an example of a process flow before the execution of a task.

FIG. 3 shows an example of a case where an e-mail is transmitted. For example, as shown in a balloon #1, in a case where a user says "e-mail to papa, "I'm coming back from now"", the information processing device 1 performs voice recognition and language analysis, and determines that a task type is "transmit e-mail", and a destination is "papa" and contents are "I'm coming back from now" which are an execution time argument.

At this point, as shown in a balloon #2, the information processing device 1 outputs a voice of "e-mail will be transmitted to papa. Contents are "I'm coming back from now". Is that OK? If it is OK with you, please say transmission.", and thereby performs task execution confirmation.

In a case where the user says "transmission" for the task execution confirmation as shown in a balloon #3, the information processing device 1 performs voice recognition and language analysis to determine that the execution of the task has been permitted by the user. Consequently, the task is executed as shown with a down arrow. In the information processing device 1, the mailer starts up, and an e-mail in which a main text contains "I'm coming back from now" is transmitted to an address of "papa".

In this manner, the timing in which the task is actually executed by the information processing device 1 is basically after the task execution confirmation.

As with a conversation between persons, regarding the voice UI, there is a case where mishearing (misrecognition) is caused by factors including: environmental noises from a TV, a washing machine and the like; a user's manner of speaking; and positional relationship between a microphone and a user. Performing confirmation before the execution of a task enables to prevent the task that differs from user's intention from being executed.

Incidentally, depending on a task, there is a task that is allowable for a user even if processing having contents that differ from user's intention is executed due to misrecognition. With respect to, for example, transmission of an e-mail, it can be said that a task, the e-mail destination of which is a family member, is more allowable for a user than a task, the destination of which is a boss of a workplace, even if an e-mail having wrong contents has been transmitted.

The information processing device 1 determines, for a certain task, a cost required in a case where processing having contents that differ from user's intention is executed, and a cost that is allowable for the user even if the task is executed by mistake. In addition, the task execution confirmation is performed by contents corresponding to a confirmation degree represented by a difference between those costs.

Although details will be described later, with respect to, for example, a task, the confirmation degree of which is high, task execution confirmation that puts a heavy load on the user is performed. For example, explicit permission is requested by saying "transmit" as described above.

On the contrary, with respect to a task, the confirmation degree of which is low, simplified task execution confirmation that puts a light load on the user is performed.

In this manner, the task execution confirmation by the information processing device 1 is not uniformly performed in the same method for all tasks, but is performed by a method corresponding to the confirmation degree. In addition, with respect to a task, the confirmation degree of which is very low, the task execution confirmation is omitted.

In a case where the same task execution confirmation is uniformly performed, performing task execution confirmation has no meaning depending on contents of a task, merely resulting in complicated work. However, it is possible to prevent such work from being requested. In other words, a load put on the user before the task execution can be reduced.

<<Relationship Between Task Cost and User's Allowance>>

If it can be determined whether or not it is necessary to perform task execution confirmation, and if a proper method for task execution confirmation can be determined, the information processing device 1 is not required to perform unnecessary confirmation. This determination is performed on the basis of a difference between the following two costs.

(1) Cost required when a task has been executed by mistake (2) Cost that is allowable for the user even if the task is executed by mistake Hereinafter, the former cost is called a false execution cost as appropriate. In addition, the latter cost is called an allowable cost. Incidentally, the cost means a negative score.

Figure 4A:
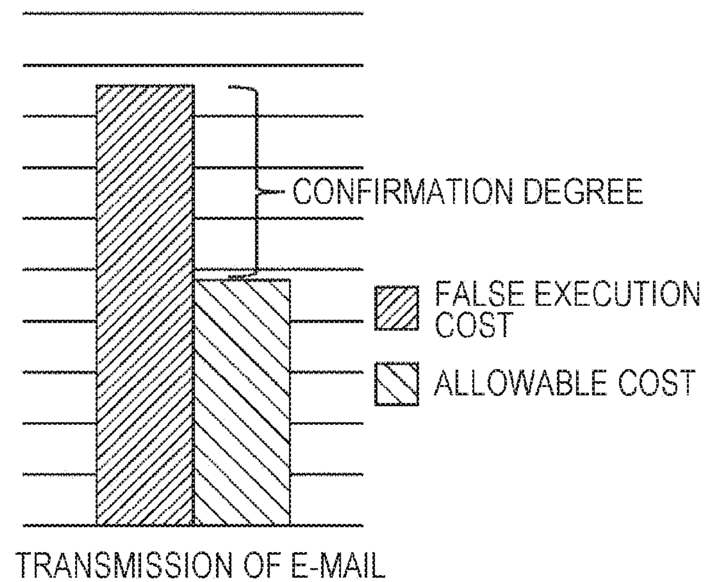
FIGS. 4A and 4B are drawings illustrating relationship between a false execution cost and an allowable cost.
Figure 4B:
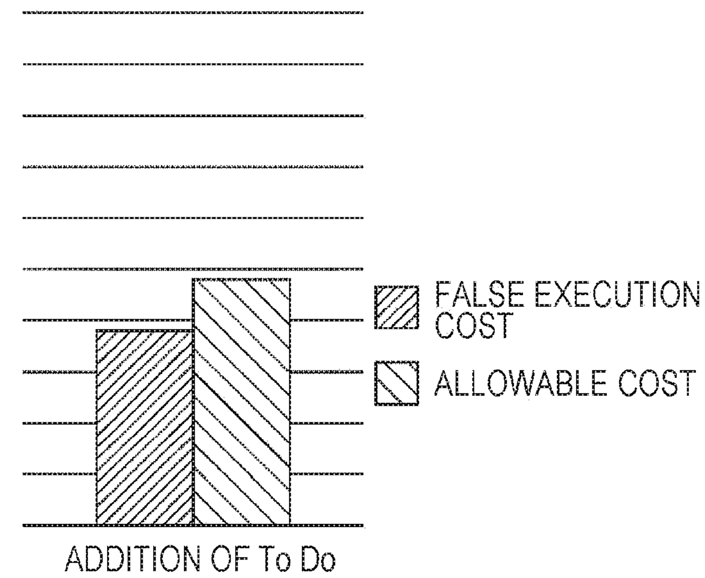

FIGS. 4A and 4B are drawings illustrating relationship between a false execution cost and an allowable cost.

A bar graph in FIG. 4A shows basic relationship between a false execution cost and an allowable cost when an e-mail is transmitted. A bar graph in FIG. 4B shows basic relationship between a false execution cost and an allowable cost when ToDo is added. In each figure, the bar graph shown on the left side indicates the false execution cost, and the bar graph shown on the right side indicates the allowable cost.

There is a possibility that an e-mail transmitted by mistake will trouble other persons. Therefore, in general, it is considered that "transmit e-mail" is a task, the false execution cost of which is high. Meanwhile, with respect to "add to ToDo", information related to the user himself/herself is merely appended. Therefore, it is considered that "add to ToDo" is a task, the false execution cost of which is low.

In the case of the example of FIGS. 4A and 4B, with respect to "transmit e-mail", the false execution cost largely exceeds the allowable cost, and therefore a confirmation degree represented as a difference between those costs is high. Accordingly, the task execution confirmation is performed in a method in which a certain level of load is put on the user.

In addition, with respect to "add to ToDo", the false execution cost is lower than the allowable cost, and thus a confirmation degree is low. Therefore, in this case, the task execution confirmation is omitted. Even in a case where the false execution cost is lower than the allowable cost, the task execution confirmation may be performed in a method in which a user's load is lighter than that in the case of "transmit e-mail".

In this manner, the information processing device 1 determines a confirmation degree on the basis of a difference between the false execution cost and the allowable cost, and determines a task execution confirmation method.

For example, initial values of the false execution cost and the allowable cost are determined by questionnaire results of many users, and are preset. Those initial values may be changed, for example, from a setting screen displayed in the information processing device 1.

<<Presentation Method Corresponding to Confirmation Degree>>

FIG. 5 is a drawing illustrating an example of correspondence relationship between a confirmation degree and a task execution confirmation method in a case where a task type is "transmit e-mail".

The example of FIG. 5 also shows a user's attention attracting method used in a case where task execution confirmation is performed by each method. In a case where task execution confirmation is performed as well, notification to a user is performed (user's attention is attracted) by a method corresponding to a confirmation degree.

It should be noted that the attention attracting method used in a case where the task execution confirmation is performed changes depending on a hardware configuration of the information processing device 1 or a communication means that becomes available according to a user's situation or the like. In the example of FIG. 5, it is assumed that the information processing device 1 is provided with a vibration function.

In the example of FIG. 5, five-stage confirmation degrees (0 to 4) are set. With the increase in number, the confirmation degree becomes higher.

In a case where the confirmation degree is "4", a user is explicitly requested to say "transmission" for confirmation. The task execution confirmation method described with reference to FIG. 3 is a method used in a case where the confirmation degree is "4".

For example, the request to say "transmit" for confirmation is made by, after a destination and contents are output, outputting system's saying, for example, "If it is OK with you, please say transmit". The system's saying means that the information processing device 1 outputs a synthetic voice. In addition, by generating longish audible vibrations, and by strengthening the tone of system's saying, a user is notified of the request for confirmation saying.

When the user says "transmit" in response to the request made by such a method, an e-mail is transmitted.

The task execution confirmation performed in a case where the confirmation degree is "4" requires the user to hear long system's saying for the task execution confirmation, and to say "transmit" as instructed by the system's saying. Therefore, the task execution confirmation is performed by a method that puts a heavy load on the user.

In a case where the confirmation degree is "3", the user is requested to perform any confirmation saying related to "transmission". The saying related to "transmission" includes "transmission", and synonyms of "transmission" such as "OK" and "Please transmit".

For example, the request to perform confirmation saying is made by, after a destination and contents are output, outputting system's saying, for example, "Is that OK?". In addition, by generating shortish audible vibrations a plurality of times, the user is notified of the request for confirmation saying.

When the user says "transmit" or a synonym thereof in response to the request made by such a method, an e-mail is transmitted.

With respect the task execution confirmation performed in a case where the confirmation degree is "3", system's saying for the task execution confirmation is short, and a synonym is sufficient for confirmation saying corresponding to the system's saying. Therefore, the task execution confirmation is performed by a method that puts a lighter load on the user in comparison with a case where the confirmation degree is "4".

In a case where the confirmation degree is "2", the user is not requested to perform confirmation saying. However, in a case where any confirmation saying related to "cancel" is performed by the user, the execution of a task is canceled. The saying related to "cancel" includes "cancel", and a synonym of "cancel" such as "Please wait".

For example, the task execution confirmation by such a method is performed by, after a destination and contents are output, outputting system's saying of a countdown such as "5, 4, 3, 2, 1", in slow rhythm. In addition, by generating shortish audible vibrations twice concurrently with the countdown, the user is notified of being able to cancel the execution of the task.

When the countdown ends without user's saying in response to the request made by such a method, an e-mail is transmitted. In addition, when the user says "cancel" or a synonym thereof, the transmission of an e-mail is canceled.

The task execution confirmation performed in a case where the confirmation degree is "2" does not require the user to perform confirmation saying in a case where the task is caused to be executed. Therefore, the task execution confirmation is performed by a method that puts a lighter load on the user in comparison with a case where the confirmation degree is "3".

In a case where the confirmation degree is "1", the user is not required to perform confirmation saying. However, in a case where the user says "cancel" for confirmation, the execution of the task is canceled.

For example, the task execution confirmation by such a method is performed by, after a destination and contents are output, outputting system's saying, a countdown such as "5, 4, 3, 2, 1", in quick rhythm. In addition, by generating shortish audible vibrations once concurrently with the countdown, the user is notified of being able to cancel the execution of the task.

When the countdown ends without user's saying in response to the request made by such a method, an e-mail is transmitted. In addition, when the user says "cancel", the transmission of an e-mail is canceled.

With respect to the task execution confirmation performed in a case where the confirmation degree is "1", system's saying of the countdown is output in quick rhythm, and a time period for hearing the system's saying is short. Therefore, the task execution confirmation is performed by a method that puts a lighter load on the user in comparison with a case where the confirmation degree is "2".

In a case where the confirmation degree is "0", the user is not requested to perform confirmation saying. The user is not allowed even to cancel the execution of the task.

For example, after a destination and contents are output, by generating short and weak audible vibrations once, the user is notified of the task execution confirmation by such a method. When the short and weak audible vibrations end, an e-mail is transmitted.

Since the confirmation saying is not requested, the task execution confirmation performed in a case where the confirmation degree is "0" is omitted.

Such a task execution confirmation method is determined beforehand on a confirmation degree basis, and is set in the information processing device 1. With respect to each task other than "transmit e-mail" as well, a task execution confirmation method and a notification method to a user are set according to the confirmation degree.

In the example of FIG. 5, the five-stage confirmation degrees are shown. However, the number of stages is arbitrary. In addition, the notification to the user is performed by system's saying and vibrations. However, the notification to the user may be performed by various methods such as screen display and LED light emission.

In a case where notification to the user is performed by screen display, confirmation degrees may be expressed by changing a display method, for example, by changing a character size, a color, a display speed or the like, so as to notify the user. In a case where the confirmation degrees are expressed by, for example, the volume, tone, or length of a voice by system's saying, or the interval (frequency), length or strength of vibrations, not stepwise expression but continuous expression becomes possible.

<<Automatic Adjustment of Allowable Cost>>

In a case where a user successively permits task execution with respect to task execution confirmation of the same task, there is a possibility that an allowable cost for the task will be higher than a set value at each point of time. In contrast, in a case where the user successively cancels (does not permit) the execution of a task, there is a possibility that an allowable cost for the task will be lower than a set value at each point of time.

An allowable cost for a certain task is adjusted by the information processing device 1 as appropriate according to a user's reaction to task execution confirmation.

Figure 6:
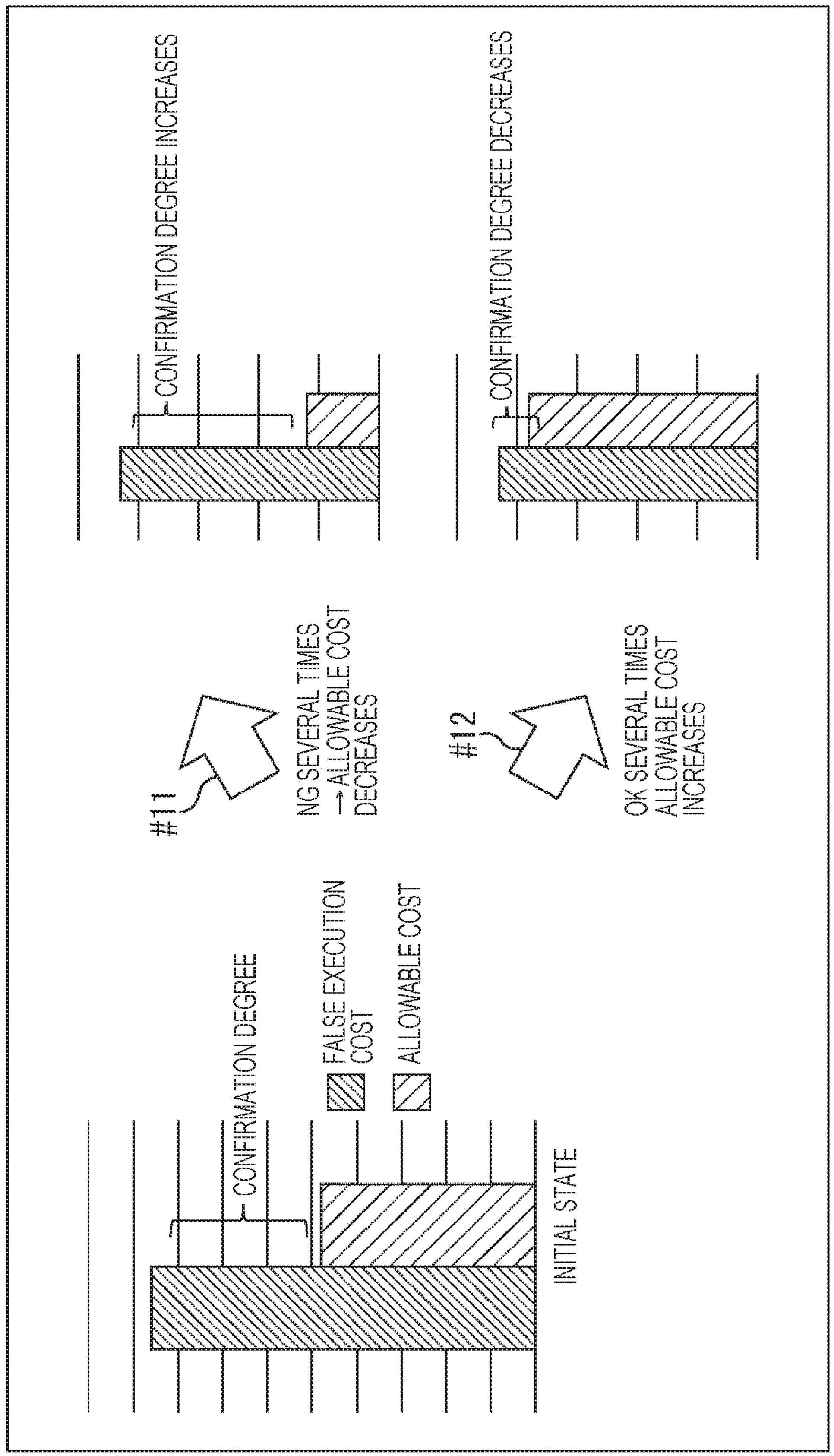
FIG. 6 is a drawing illustrating an example of adjusting an allowable cost.

FIG. 6 is a drawing illustrating an example of adjusting an allowable cost.

In a case where the user cancels task execution confirmation of a certain task many times, an allowable cost decreases every time the user cancels the task execution confirmation as shown with an arrow #11.

The allowable cost decreases while the false execution cost is kept unchanged, and therefore the confirmation degree increases. The next task execution confirmation of the same task is performed by a method that puts a heavier load on the user.

Meanwhile, in a case where the user permits task execution confirmation of a certain task many times, an allowable cost increases every time the user permits the task execution confirmation as shown with an arrow #12.

The allowable cost increases while the false execution cost is kept unchanged, and therefore the confirmation degree decreases. The next task execution confirmation of the same task is performed by a method that puts a lighter load on the user.

In this manner, with respect to the information processing device 1, a system is realized in such a manner that every time the user permits task execution confirmation, a load put on the user gradually becomes lighter in the task execution confirmation method. In addition, with respect to a task, the confirmation degree of which is very low, the task execution confirmation is finally omitted.

As the result, a system is realized in which authority of executing a task is transferred to the information processing device 1 stepwise.

In a case where the same task execution confirmation is uniformly performed, performing task execution confirmation has no meaning depending on contents of a task, merely resulting in complicated work. However, it is possible to prevent such work from being requested. In other words, a load put on the user before the task execution can be reduced.

Incidentally, in the case of a task that is important for a user, in particular, in the case of "transmit e-mail", excessively increasing the allowable cost may cause task execution confirmation to be omitted, and consequently automatic execution may cause inconvenience. In order to avoid such inconvenience, it is possible to set an upper limit value of the allowable cost on a task type basis.

For example, when task execution confirmation is omitted in a case where the allowable cost exceeds the false execution cost as described above, by setting a value lower than or equal to the false execution cost value as an upper limit value of the allowable cost, the task execution confirmation can be adapted to be always performed.

<<False Execution Cost>>

<Information for Calculation>

For example, in a case where transmission of an e-mail is considered, it can be considered that even in the case of the same task, a false execution cost largely differs between transmitting an e-mail to a family member by mistake and transmitting an e-mail to a boss of workplace by mistake.

The false execution cost is calculated on the basis of a combination of a task type and task execution time arguments.

Specifically, the false execution cost is calculated on the basis of a distance in a space (vector space) formed when each task is represented as feature quantity (vector) in which execution time arguments are elements. Tasks represented by feature quantities that are close in distance become tasks having high similarity.

•Categorization of task types

Tasks of each type are categorized by properties obtained by generalizing the features thereof, and are vectorized.

Figure 7:
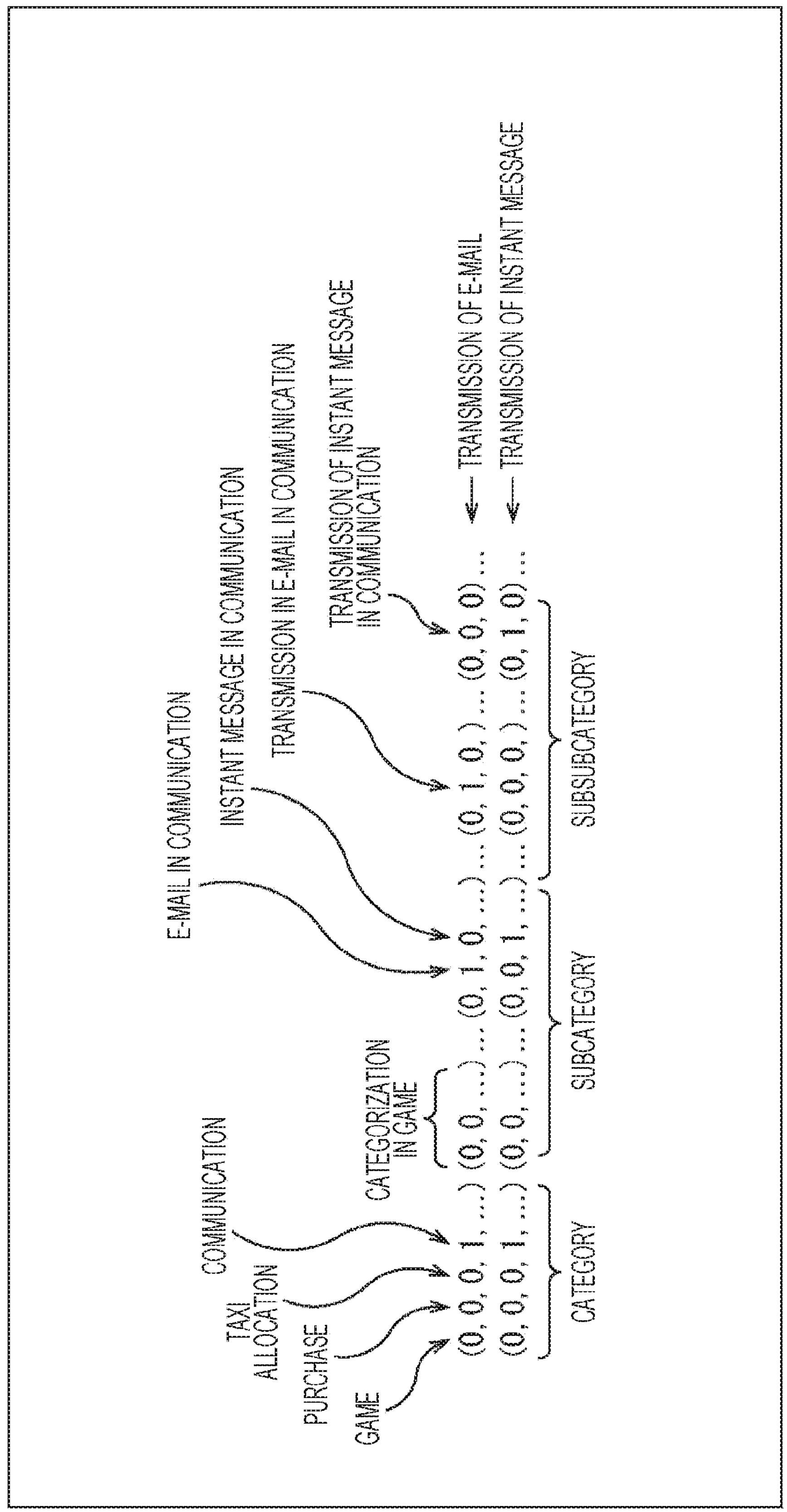
FIG. 7 is a drawing illustrating an example of categorizing task types.

FIG. 7 is a drawing illustrating an example of categorizing task types.

As shown in FIG. 7, for example, each task is categorized by hierarchized properties, for example, category, subcategory, and subsubcategory. The category is formed by elements representing properties such as game, purchase, taxi allocation, and communication. Similarly, the subcategory and the subsubcategory are also formed by a plurality of elements representing properties of a task.

Here, for example, a task of transmitting an e-mail and a task of transmitting an instant message are hierarchically categorized as described below. In each category, a value of an element representing the property of a task is set at 1.

"Transmission of e-mail"

Category=communication

Subcategory=e-mail

Subsubcategory=transmission

"Transmission of instant message"

Category=communication

Subcategory=instant message

Subsubcategory=transmission

The tasks of "transmission of e-mail" and "transmission of instant message" both have the category-level property of "communication", and therefore it can be said that the tasks are close to each other in distance. In a case where a distance between tasks is represented by a cosine distance in a space, tasks each having the same element are tasks that are close to each other.

With respect to other tasks as well, for example, "addition to ToDo", "taxi allocation", "control of indoor air conditioning", "purchase of product" and the like, each task is categorized according to the property thereof, and is vectorized.

Since each vector becomes a vector having many zeros (sparse vector), each vector may be represented by an index of an element having a value other than zero, and the value, by using sparse coding.

In a case where a task has a plurality of properties, a plurality of elements may be set with values respectively in one category. For example, in a case where a task has the property of "communication", and has the property of "game", each of the corresponding elements is set with a value of 0.5 in the category.

•Categorization of execution time argument

Execution time arguments are also represented by properties obtained by generalizing the features thereof.

For example, with respect to an e-mail destination as an execution time argument, even if an e-mail address like aaa@bbb.com is directly expanded into a vector, only tasks each having the same destination as the execution time argument enable to determine a distance between the tasks. By categorizing execution time arguments by properties, it becomes possible to determine a distance between tasks that differ in destination as the execution time argument.

FIG. 8 is a drawing illustrating an example of categorizing e-mail destinations.

As shown in FIG. 8, user's wife, user's child, boss of workplace, and person responsible of customer, which are e-mail destinations, are each hierarchically categorized as described below.

"Wife"
Category=relative
Subcategory=living together
Subsubcategory=wife
"Child"
Category=relative
Subcategory=living together
Subsubcategory=child
"Boss of workplace"
Category=work
Subcategory=inside the company
Subsubcategory 1=same division
Subsubcategory 2=boss
"Person responsible of customer"
Category=work
Subcategory=outside the company
Subsubcategory=person responsible Each execution time argument explained with reference to FIG. 2, for example, contents of e-mail, is also categorized according to properties, and is vectorized.

For example, with respect to contents (main text) of an e-mail, instead of using, as an element, words contained in the main text as they are, the words may be converted into expression by which a distance can be more easily determined, for example, by using a large-scale corpus, and by converting the words into vector distributed representation by algorithm such as word2vec.

In this manner, by hierarchically categorizing each execution time argument according to properties, and by expressing the each execution time argument as a vector in which each element is set with a predetermined value, a distance in a space can be calculated.

Each task that is represented as a combination of a task type and execution time arguments is represented as a vector in which a result of categorization according to the property of the task type is combined with a result of categorization according to the property of the execution time argument as described above. Hereinafter, a vector that represents each task is referred to as a "task vector" as appropriate.

<Estimation from Information Designed Beforehand>

A representative task that is a typical task is set with a false execution cost beforehand. A plurality of tasks is prepared as representative tasks. The false execution cost that has been set to the representative task is information serving as a reference of a false execution cost to be determined.

For example, a false execution cost of a target task is estimated by an average of false execution costs of k representative tasks that are close to the target task, the false execution cost of which is to be determined (k-nearest neighbor algorithm). The k-nearest neighbor algorithm is a method in which an attribute value of an object is determined from an average value of attribute values of k nearest neighbor object groups. A heavier weight can also be assigned to an attribute value of a closer object.

A specific example of calculating a false execution cost will be described.

It is assumed that a task vector $T_i$, which is a representative task i (i=1 to N) set with a false execution cost beforehand, is represented by the following equation (1).

[Equation 1]

$$T_i=(T_{i1}, T_{i2}, \ldots T_{ij}, \ldots T_{iM}) \tag{1}$$

It is assumed that the false execution cost of the representative task is $C_i$.

It is assumed that a task vector U of a target task, the false execution cost of which is to be determined, is represented by the following equation (2).

[Equation 2]

$$U=(U_1, U_2, \ldots U_j, \ldots U_M) \tag{2}$$

In this case, cosine similarity $s_i$ of the task vectors Ti and U is represented by the following equation (3).

[Equation 3]

$$s_i = \cos(T, U_i) = \frac{\sum_{j=1}^{M} T_{ij}U_j}{\sqrt{\sum_{j=1}^{M} T_{ij}^2}\sqrt{\sum_{j=1}^{M} U_j^2}} \tag{3}$$

Representative tasks are sorted in short-distance order on the basis of the cosine similarity $s_i$. From a sample in proximity to K (K≤N), a false execution cost $C_U$ of the task vector U is estimated by the following equation (4).

[Equation 4]

$$C_U = \frac{\sum_{i=1}^{K} s_i C_i}{\sum_{i=1}^{K} s_i} \tag{4}$$

In this manner, the false execution cost of each task is estimated from a distance from the representative task. It should be noted that the calculation of the false execution cost by using the k-nearest neighbor algorithm is merely an example, and therefore may be calculated by other methods.

A representative task, and a false execution cost of the representative task may be prepared for each user's property such as age and sex. By calculating a false execution cost on the basis of a representative task having the same property as user's property, a false execution cost that is suitable for the user's property can be estimated.

<Estimation from Data Used by Many Users>

A false execution cost of each task may be estimated from use tendencies of many users instead of calculating by using the false execution cost of the representative task.

For example, it is considered that with respect to a task for which the number of users who cancels the execution of the task (not the number of times) in task execution confirmation is large, the false execution cost is relatively higher in comparison with a task for which the numbers of users who cancels the execution of the task is small. In addition, it is considered that with respect to a task for which a low allowable cost is set by many users, the false execution cost is relatively high.

On the basis of the relationship, such a model in which a combination of a task type and execution time arguments is input, and in which a false execution cost is output, is generated by learning, and the false execution cost may be determined by using the model. In other words, in this example, the false execution cost is calculated on the basis of reactions of many other users, who use a device having an agent function similar to that of the information processing device 1, to the task execution confirmation.

<Example of Financial Calculation>

Among tasks, there is a task, the false execution cost of which can be explicitly estimated as a financial cost (the amount of money) from a difference between a current state and a desired state.

For example, in the case of a task of allocating a taxi, the amount of money required for the allocation of the taxi can be estimated, for example, from a distance between a current place of the taxi and a place where the taxi is allocated, and current traffic conditions. In this case, the amount of money required for the allocation of the taxi is determined as the false execution cost.

In addition, in a case where an air conditioner at home is switched on before returning home from a visiting destination by a task of controlling an indoor air conditioning, an electric bill required for adjusting to a specified temperature can be estimated from the current room temperature, the desired room temperature, and the time left before returning home. In this case, the electric bill required for adjusting to the specified temperature is determined as the false execution cost.

Figure 9:
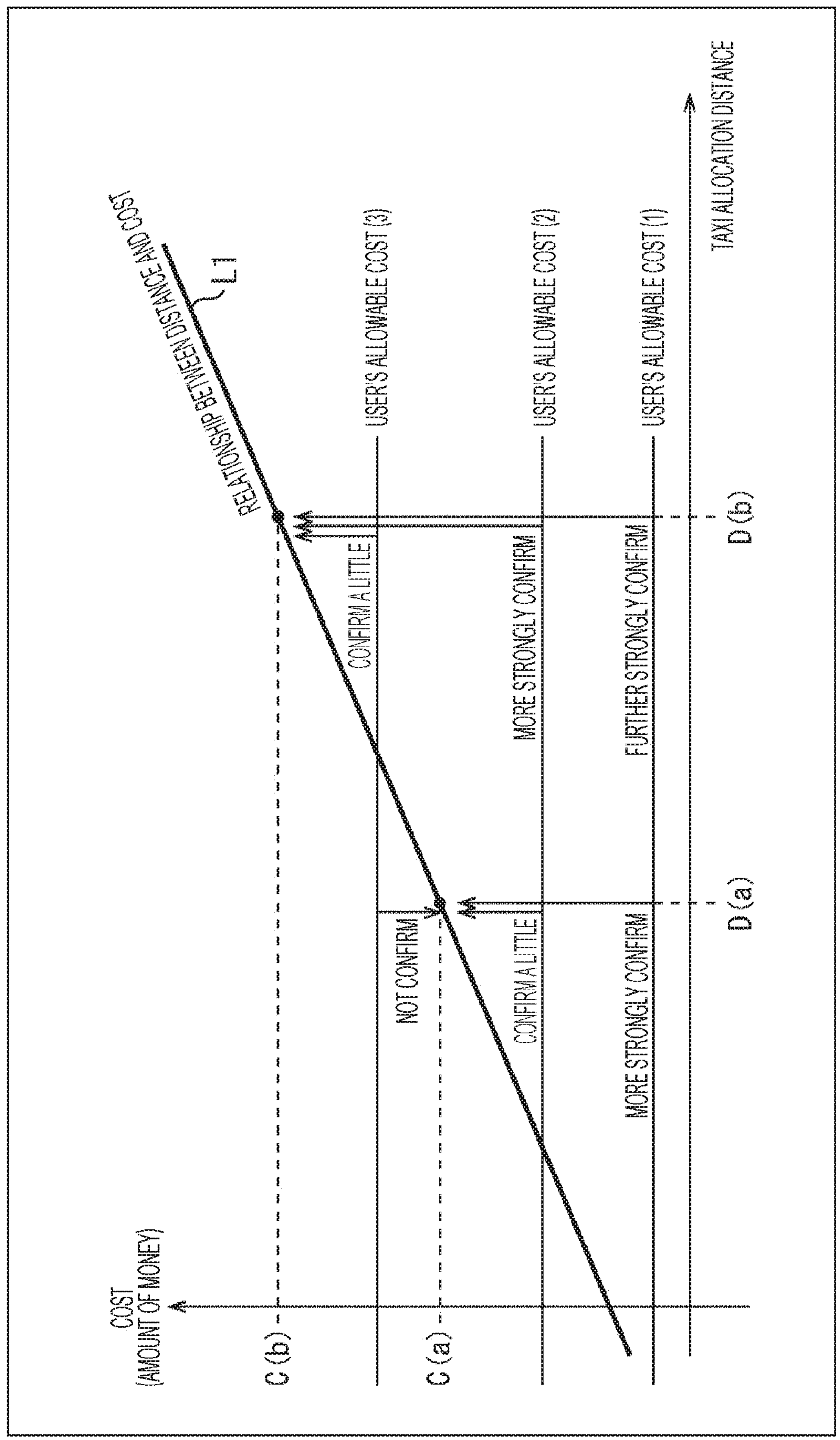
FIG. 9 is a drawing illustrating an example of a case where a false execution cost is determined.

FIG. 9 is a drawing illustrating an example of a case where the amount of money required for allocating a taxi is determined as a false execution cost.

The horizontal axis of FIG. 9 indicates a distance of taxi allocation (a distance between a current place of the taxi and a place where the taxi is allocated), and the vertical axis indicates the amount of money. The distance of taxi allocation and the amount of money are represented by a straight line L1. In this manner, usually, with the increase in distance of taxi allocation, the amount of money increases.

In a case where a distance of taxi allocation is represented as a distance D(a), the false execution cost is determined as the amount of money C(a).

In this case, when an allowable cost is represented by, for example, a cost (1), a confirmation degree becomes higher, and therefore task execution confirmation is performed by a method that puts a heavy load on a user. In addition, when the allowable cost is represented by, for example, a cost (2), the confirmation degree becomes slightly high, and therefore the task execution confirmation is performed by a method that puts a light load on the user. When the allowable cost is represented by, for example, a cost (3), the confirmation degree becomes low, and therefore the task is executed without performing the task execution confirmation.

In addition, in a case where a distance of taxi allocation is represented as a distance D(b), a false execution cost is determined as the amount of money C(b) that is higher than that in the case of the distance D(a).

In this case, when the allowable cost is represented by, for example, the cost (1), the confirmation degree becomes very high, and therefore the task execution confirmation is performed by a method that puts a heavier load on the user in comparison with a case where the distance of taxi allocation is the distance D(a). In addition, when the allowable cost is represented by, for example, the cost (2), the confirmation degree becomes high, and therefore the task execution confirmation is performed by a method that puts a heavier load on the user in comparison with a case where the distance of taxi allocation is the distance D(a). When the allowable cost is represented by, for example, the cost (3), the confirmation degree becomes slightly high, and therefore the task execution confirmation is performed by a method that puts a light load on the user.

In this manner, the amount of money that is actually required is determined from a difference between a current user's state and a state that is desired to be realized by executing the task, and the determined amount of money can be treated as the false execution cost. Information that is used to determine the amount of money according to a difference between a certain state and another state is prepared in the information processing device 1 beforehand.

<<Additional Control by Context Such as Operational Environment>>

In a case where there are, for example, noises such as sounds of a television program, and a driving sound of a washing machine in an environment in which a user uses the information processing device 1, there is a case where misrecognition of a voice occurs, and consequently user's intention is not correctly conveyed to the information processing device 1. In addition, if the information processing device 1 is an apparatus such as a smart phone, using the information processing device 1 while walking may cause wrong operation. Other than the above, in a case where the continuous use time of the information processing device 1 is long, it is considered that fatigue may increase operating errors.

These contexts can be detected by sensors provided in the information processing device 1 as described below.

Noises: by using a microphone array, steady sounds that differ from a user's voice (person's voice), and a sound, the sound source of which has a steady direction, are detected as noises.

Behavior: on the basis of, for example, a result of positioning by an acceleration sensor, a gyro sensor, a GNSS, walking or running is detected from a moving speed and characteristics of vibrations.

Fatigue degree: the fatigue degree is detected on the basis of the sleeping time identified by a measurement result of a sleep sensor, and the continuous use time identified by a use history of the information processing device 1.

On the basis of the pieces of information, the information processing device 1 quantitatively evaluates the accuracy with which contents of an instruction are conveyed to the information processing device 1 as intended by the user. In addition, the information processing device 1 compares the evaluation value with the reference value, and adjusts the confirmation degree according to a difference.

For example, in a case where there is a high possibility that misrecognition of a voice will occur because of high noises, with the result that the accuracy with which contents of an instruction are conveyed as intended by the user is low (in a case where the evaluation value is lower than the reference value), the information processing device 1 adjusts the confirmation degree to be increased according to a difference between the reference value and the evaluation value.

In addition, in a case where there is a low possibility that misrecognition of a voice will occur because of low noises, with the result that the accuracy with which the contents of the instruction are conveyed as intended by the user is high (in a case where the evaluation value is higher than the reference value), the information processing device 1 adjusts the confirmation degree to be decreased according to a difference between the reference value and the evaluation value.

In other words, it can be considered that with the increase in noise level, the accuracy of detecting user's input by voice becomes low. In addition, in a case where the user is walking, running, or moving, it can be considered that user's input is not stable, and consequently the accuracy of detecting the user's input becomes low. Moreover, it can be considered that with the increase in fatigue degree of the user, user's input becomes more unstable, and consequently the accuracy of detecting the user's input becomes low.

By adjusting the confirmation degree on the basis of such contexts, and then by performing the task execution confirmation by a method corresponding to the adjusted confirmation degree, a task that is not intended by the user can be prevented from being executed by the environmental factor.

<<Stop of Execution>>

In a case where a difference between the false execution cost and the allowable cost is larger than a threshold value, there is a possibility that there will be a situation in which an operational environment is bad or in which the influence exerted when a task has been executed by mistake is very large. In this case, the information processing device 1 automatically stops the execution of the task without performing the task execution confirmation.

At this point, the information processing device 1 presents, to the user, a notification that the execution of the task has been stopped, together with information related to a factor that causes the determination that the false execution cost is high. By feeding back using a system voice, for example, "The task has not been executed because of high noises. In order to execute the task again, please try the execution of the task in a low noise place", the user can check the factor that has caused the execution of the task to be stopped.

<Configuration Example of Information Processing Device 1>

Figure 10:
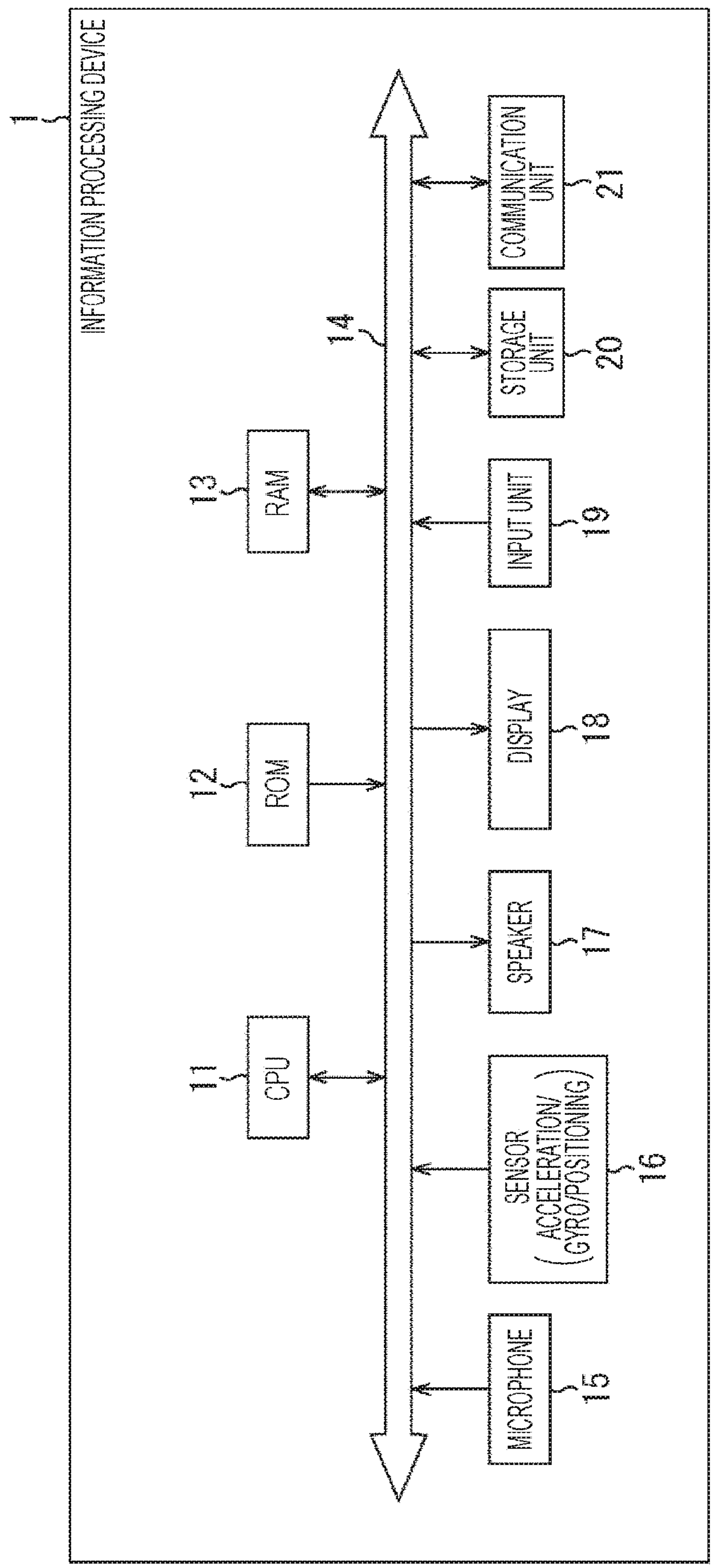
FIG. 10 is a block diagram illustrating an example of a hardware configuration of an information processing device.

FIG. 10 is a block diagram illustrating an example of a hardware configuration of the information processing device 1.

A Central Processing Unit (CPU) 11, a Read Only Memory (ROM) 12, and a Random Access Memory (RAM) 13 are mutually connected through a bus 14.

A microphone 15, a sensor 16 and a speaker 17 are connected to the bus 14. The microphone 15 includes a microphone array, and detects a voice spoken by a user. The sensor 16 includes various sensors such as an acceleration sensor, a gyro sensor, and a positioning sensor. The sensor 16 outputs information indicating detection results such as an acceleration, an angular speed, and a current position. The speaker 17 outputs a synthetic voice by system's saying.

In addition, a display 18 and an input unit 19 are connected to the bus 14. The display 18 includes an LCD, an organic EL display, and the like. The display 18 displays various screens. The input unit 19 includes a touch panel provided on the display 18 in an overlapped manner, and various buttons that are provided on a housing of the information processing device 1. The input unit 19 detects operation by a user, and outputs information indicating contents of the operation.

A storage unit 20 and a communication unit 21 are also connected to the bus 14. The storage unit 20 includes a hard disk, a nonvolatile memory, and the like. The storage unit 20 stores not only a program executed by a CPU 11, but also various data, including information used to calculate a confirmation degree, and data of synthetic voices for system's saying.

The communication unit 21 includes a network interface. Through wireless or wired communications, the communication unit 21 communicates with external devices such as a mobile terminal carried by a user, and a server on the Internet.

FIG. 11 is a block diagram illustrating an example of a functional configuration of the information processing device 1. At least a part of functional units shown in FIG. 11 is realized by executing a predetermined program by the CPU 11 in FIG. 10.

In the information processing device 1, a voice recognition unit 31, a language analysis unit 32, a false execution cost calculation unit 33, an amount-of-money calculation current value obtaining unit 34, and a storage unit 35 are realized. In addition, in the information processing device 1, a noise estimation unit 36, a behavior estimation unit 37, a use-log management unit 38, a confirmation degree calculation unit 39, a confirmation application execution unit 40, an application execution control unit 41, an allowable cost calculation unit 42, and an allowable cost setting unit 43 are realized.

The voice recognition unit 31 performs voice recognition of user's saying on the basis of a voice signal input from the microphone 15. The voice recognition unit 31 outputs a character string indicating contents of user's saying to the language analysis unit 32. A character string is output to the language analysis unit 32 every time a user says.

The language analysis unit 32 subjects the character string supplied from the voice recognition unit 31 to natural language analysis, and identifies the task type and execution time arguments of a task that has been input by the user using a voice UI. The language analysis unit 32 outputs the identified task information to the false execution cost calculation unit 33 and the application execution control unit 41.

In addition, the language analysis unit 32 identifies a user's reaction by analyzing the character string that has been input at the time of task execution confirmation, and outputs information indicating the user's reaction to the confirmation application execution unit 40.

The false execution cost calculation unit 33 calculates a false execution cost of the task identified by the language analysis unit 32. In calculation of the false execution cost, information obtained by the amount-of-money calculation current value obtaining unit 34, and various information stored in the storage unit 35 are referred to as appropriate.

For example, the false execution cost calculation unit 33 categorizes the task identified by the language analysis unit 32 on the basis of information stored in a general cost storage unit 113, and calculates a task vector. In addition, the false execution cost calculation unit 33 reads information related to the representative task stored in the set value storage unit 112, determine a distance between a target task, the false execution cost of which is to be determined, and a representative task, and calculates the false execution cost.

Moreover, in a case where the task identified by the language analysis unit 32 is a task, the false execution cost of which can be estimated by means of the amount of money, the false execution cost calculation unit 33 calculates the amount of money corresponding to the false execution cost on the basis of a difference between a current state and a state that is desired to be realized. In calculation of the amount of money, information stored in an amount-of-money calculation information storage unit 111 is referred to as appropriate. Information indicating the current state is supplied from the amount-of-money calculation current value obtaining unit 34 to the false execution cost calculation unit 33.

Further, in a case where the false execution cost calculation unit 33 calculates the false execution cost on the basis of tendencies of task execution confirmation by many other users, the false execution cost calculation unit 33 refers to a model stored in a learned cost model storage unit 114, and calculates the false execution cost of the task identified by the language analysis unit 32.

The false execution cost calculation unit 33 outputs information related to the false execution cost that has been calculated in this manner to the confirmation degree calculation unit 39.

The amount-of-money calculation current value obtaining unit 34 obtains various information related to a current state, for example, by controlling the communication unit 21 to communicate with an external device.

For example, the amount-of-money calculation current value obtaining unit 34 obtains taxi current position information used to determine the amount of money required for taxi allocation from a server that manages a position of each taxi used for taxi allocation services. In addition, the amount-of-money calculation current value obtaining unit 34 obtains, from an air conditioner, current room temperature information used to determine the amount of money required for the adjustment of temperature. The amount-of-money calculation current value obtaining unit 34 outputs the obtained information to the false execution cost calculation unit 33.

The storage unit 35 includes the amount-of-money calculation information storage unit 111, the set value storage unit 112, the general cost storage unit 113, and the learned cost model storage unit 114. The storage unit 35 is realized, for example, in the storage unit 20. The information stored in each unit of the storage unit 35 is referred to by the false execution cost calculation unit 33 as appropriate.

The amount-of-money calculation information storage unit 111 stores various information used in a case where the false execution cost is estimated by the amount of money. For example, the amount-of-money calculation information storage unit 111 stores information related to the taxi allocation distance and the amount of money explained with reference to FIG. 9, the information being used to determine the amount of money required for taxi allocation. In addition, the amount-of-money calculation information storage unit 111 stores information related to an electricity charge per unit time, the information being used to determine the amount of money required for the adjustment of the temperature.

The set value storage unit 112 stores information related to a task vector of a representative task, and information related to a false execution cost of the representative task.

The general cost storage unit 113 stores various information used to calculate the false execution cost, the various information such as information related to categorization used to generate a task vector.

The learned cost model storage unit 114 stores a model generated by performing learning on the basis of tendencies of task execution confirmation by many other users. For example, learning of a model is performed by a server that is connected through the Internet. Information that has been transmitted from the server is received by the communication unit 21, and is then stored in the learned cost model storage unit 114.

The information processing device 1 may be adapted to obtain information related to a result of task execution confirmation by communicating with other devices each having an agent function similar to that of the information processing device 1, and to perform model learning in the information processing device 1.

The noise estimation unit 36 analyzes a voice signal input from the microphone 15, and estimates a noise component included in the voice signal. As described above, for example, steady sounds that differ from a user's voice, a sound, the sound source of which has a steady direction, and the like are detected as noises. The noise estimation unit 36 outputs information related to the estimated noises to the confirmation degree calculation unit 39.

The behavior estimation unit 37 analyzes vibration information represented by an acceleration, an angular speed and the like input from the sensor 16, and estimates user's behavior such as user's walking, and user's running. In addition, the behavior estimation unit 37 controls the communication unit 21 to obtain information related to user's sleeping from a wearable device worn by a user, and thereby to estimate the sleeping time. The behavior estimation unit 37 outputs information related to the user's behavior and the sleeping time that have been estimated to the confirmation degree calculation unit 39.

The use-log management unit 38 manages a use history of the information processing device 1 by a user. The use-log management unit 38 calculates a fatigue degree of the user on the basis of the continuous use time of the information processing device 1, and outputs information related to the continuous use time and the fatigue degree to the confirmation degree calculation unit 39.

In this manner, the noise estimation unit 36, the behavior estimation unit 37, and the use-log management unit 38 each function as a detection unit for detecting a context. In this example, noise information, behavior information, sleep information, the continuous use time, and fatigue degree information are used as context information. However, various information such as biological information of a user, and a current time zone may be included in the context information.

The confirmation degree calculation unit 39 calculates a confirmation degree on the basis of a difference between the false execution cost calculated by the false execution cost calculation unit 33 and the allowable cost set by the allowable cost setting unit 43.

In addition, the confirmation degree calculation unit 39 evaluates the accuracy with which an instruction is conveyed as intended by the user in a current situation on the basis of the context information. The confirmation degree calculation unit 39 adjusts the confirmation degree according to the accuracy of user's input.

Information related to noises output from the noise estimation unit 36, information related to the user's behavior and the user's sleeping time output from the behavior estimation unit 37, and information related to the continuous use time and the fatigue degree output from the use-log management unit 38 are input, as context information, into the confirmation degree calculation unit 39.

The confirmation degree calculation unit 39 outputs the calculated confirmation degree information to the confirmation application execution unit 40.

The confirmation application execution unit 40 controls the execution of an application for performing task execution confirmation, and performs the task execution confirmation by a method corresponding to the confirmation degree calculated by the confirmation degree calculation unit 39.

For example, the confirmation application execution unit 40 outputs a signal of system's saying to the speaker 17 so as to cause the speaker 17 to output the system's saying. Information related to a task type and an execution time argument is supplied from the language analysis unit 32 to the confirmation application execution unit 40. In addition, the confirmation application execution unit 40 generates audible vibrations, as appropriate, by causing an unillustrated vibration generation unit to be driven, and thereby notifies the user of the task execution confirmation.

Information indicating a user's reaction to the task execution confirmation is also supplied from the language analysis unit 32 to the confirmation application execution unit 40. In a case where the user permits the execution of a task, the confirmation application execution unit 40 outputs information for instructing the execution of the task to the application execution control unit 41. In addition, in a case where the user instructs cancelling of the execution of a task, the confirmation application execution unit 40 outputs information for instructing cancelling of the execution of the task to the application execution control unit 41. The confirmation application execution unit 40 outputs information indicating a user's reaction to the task execution confirmation to the allowable cost calculation unit 42.

The application execution control unit 41 controls the execution of an application associated with each task. For example, in a case where information for instructing the execution of a task is supplied from the confirmation application execution unit 40, the application execution control unit 41 starts an application associated with a task, the task type of which has been identified by the language analysis unit 32, and causes the application to perform processing of contents corresponding to the execution time argument.

The allowable cost calculation unit 42 updates an allowable cost of each task managed by the allowable cost setting unit 43 according to a user's reaction to task execution confirmation.

As described above, in a case where the user permits task execution confirmation of a certain task, the allowable cost calculation unit 42 causes an allowable cost to be updated higher than the previous value. In addition, in a case where the user cancels task execution confirmation of a certain task, the allowable cost calculation unit 42 causes an allowable cost to be updated lower than the previous value. An update width may be constant, or may change according to the execution time argument or the like.

The allowable cost setting unit 43 manages an allowable cost of each task, and changes the allowable cost according to the control by the allowable cost calculation unit 42 as appropriate. The allowable cost setting unit 43 outputs information related to the allowable cost to the confirmation degree calculation unit 39, and sets the allowable cost. In addition, the allowable cost setting unit 43 sets an upper limit value of the allowable cost as appropriate.

<<Operation of Information Processing Device 1>>

Here, task execution processing of the information processing device 1 having the configuration as described above will be described with reference to a flowchart shown in FIG. 12.

Figure 12:
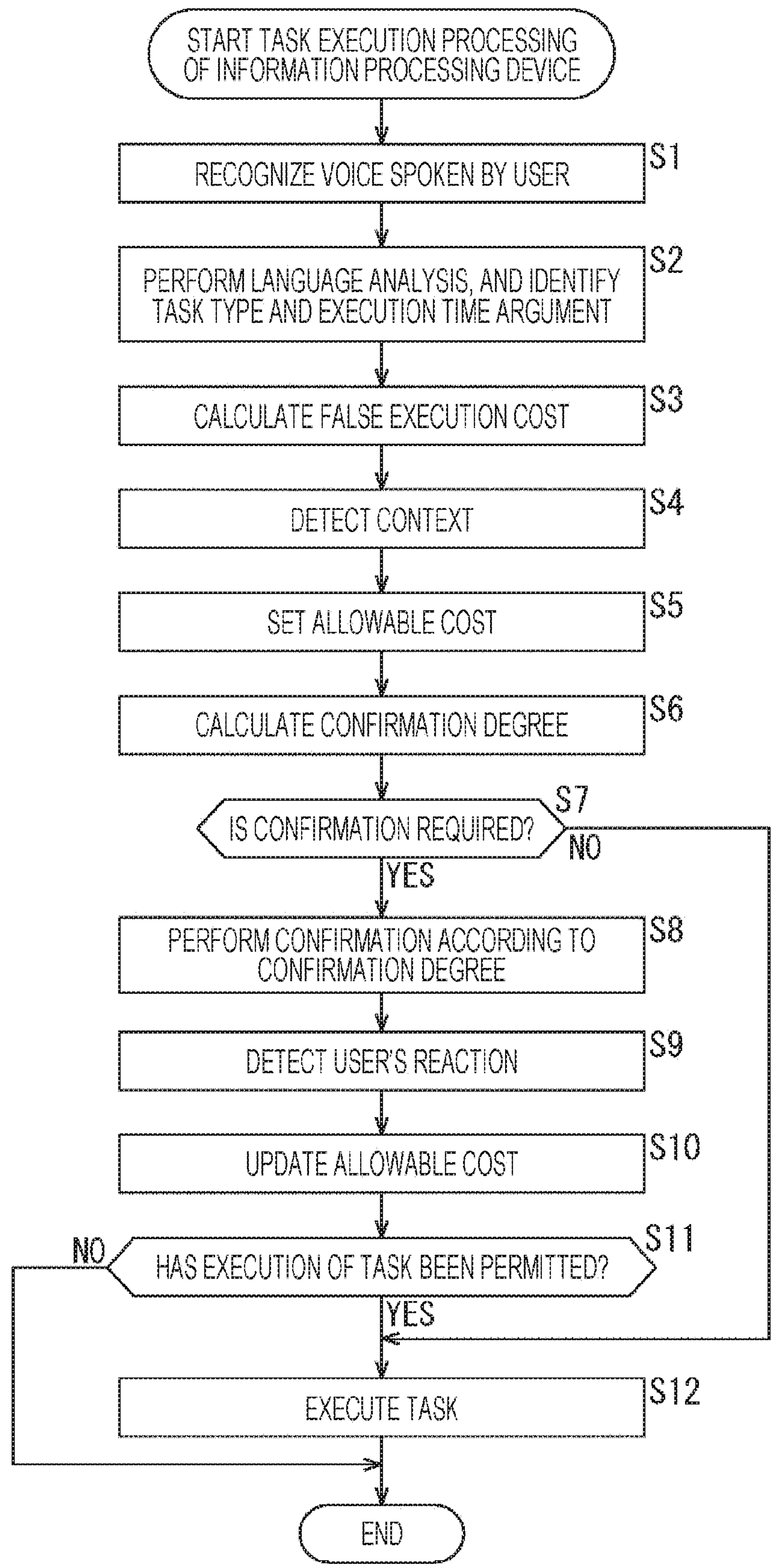
FIG. 12 is a flowchart illustrating task execution processing of an information processing device.

Processing shown in FIG. 12 is started when a voice instructing the execution of a task has been input by a user.

In step S1, the voice recognition unit 31 performs voice recognition of user's saying on the basis of a voice signal input from the microphone 15.

In step S2, the language analysis unit 32 subjects a character string obtained by the voice recognition to natural language analysis, and thereby identifies the task type and execution time arguments of the task input by the user.

In step S3, the false execution cost calculation unit 33 calculates a false execution cost of the task identified by the language analysis unit 32.

In step S4, a context is detected. In other words, the noise estimation unit 36 detects a noise component on the basis of a voice signal input from the microphone 15. The behavior estimation unit 37 estimates behavior of the user, and estimates the sleeping time of the user, on the basis of a result of detection by the sensor 16. The use-log management unit 38 identifies the continuous use time and a fatigue degree on the basis of a use history of the information processing device 1 used by the user.

In step S5, the allowable cost setting unit 43 sets an allowable cost related to a task, the confirmation degree of which is to be calculated.

In step S6, the confirmation degree calculation unit 39 calculates a difference between the false execution cost calculated by the false execution cost calculation unit 33 and the allowable cost set by the allowable cost setting unit 43 as a confirmation degree. The confirmation degree calculation unit 39 adjusts the confirmation degree as appropriate on the basis of the context information.

In step S7, on the basis of the confirmation degree calculated by the confirmation degree calculation unit 39, the confirmation application execution unit 40 determines whether or not task execution confirmation is required.

In a case where it is determined, in step S7, that the task execution confirmation is required, the confirmation application execution unit 40 performs the task execution confirmation by a method corresponding to the confirmation degree in step S8.

In step S9, the confirmation application execution unit 40 detects a user's reaction to the task execution confirmation on the basis of information supplied from the language analysis unit 32. Information indicating the detected user's reaction is supplied to the allowable cost calculation unit 42.

In step S10, the allowable cost calculation unit 42 updates an allowable cost of each task managed by the allowable cost setting unit 43 according to the user's reaction to the task execution confirmation.

In step S11, on the basis of the user's reaction to the task execution confirmation, the confirmation application execution unit 40 determines whether or not the execution of the task has been permitted.

In a case where it is determined, in step S11, that the execution of the task has been permitted, the application execution control unit 41 starts an application associated with a task, the task type of which has been identified by the language analysis unit 32, and causes the application to perform processing corresponding to the execution time argument in step S12.

For example, in a case where it is determined, in step S7, that the task execution confirmation is not required because the allowable cost exceeds the false execution cost, steps S8 to S11 are skipped, and the task is executed in step S12.

In a case where the task has been executed, or in a case where it is determined, in step S11, that the user has instructed cancelling of the execution of the task for the task execution confirmation, the processing is ended. The above-described processing is repeated every time a voice instructing the execution of a task is input by the user.

It should be noted that the above-described processing, such as the processing of setting an upper limit value of the allowable cost, and processing of, in a case where the false execution cost exceeds the allowable cost by the threshold value or more, stopping the execution of the task, are also performed as appropriate.

As the result of the above processing, in a case where the user continuously permits the execution of the task for the task execution confirmation, a load put on the user by the task execution confirmation is gradually lightened, and finally a task will be automatically executed without task execution confirmation. This enables the user to execute tasks without expending labor for confirmation.

Modified Example

<Task Execution in Screen UI>

A case where the execution of a task is input by a user using the voice UI, and the task execution confirmation is performed by using the voice UI has been described. However, the processing as described above can be applied even in a case where a screen UI is used.

In this case, by operation for a screen displayed in the display 18, the execution of the task is instructed by the user. In addition, before the task is executed according to the instruction of the user, a screen for the task execution confirmation is displayed in the display 18.

Figure 13:
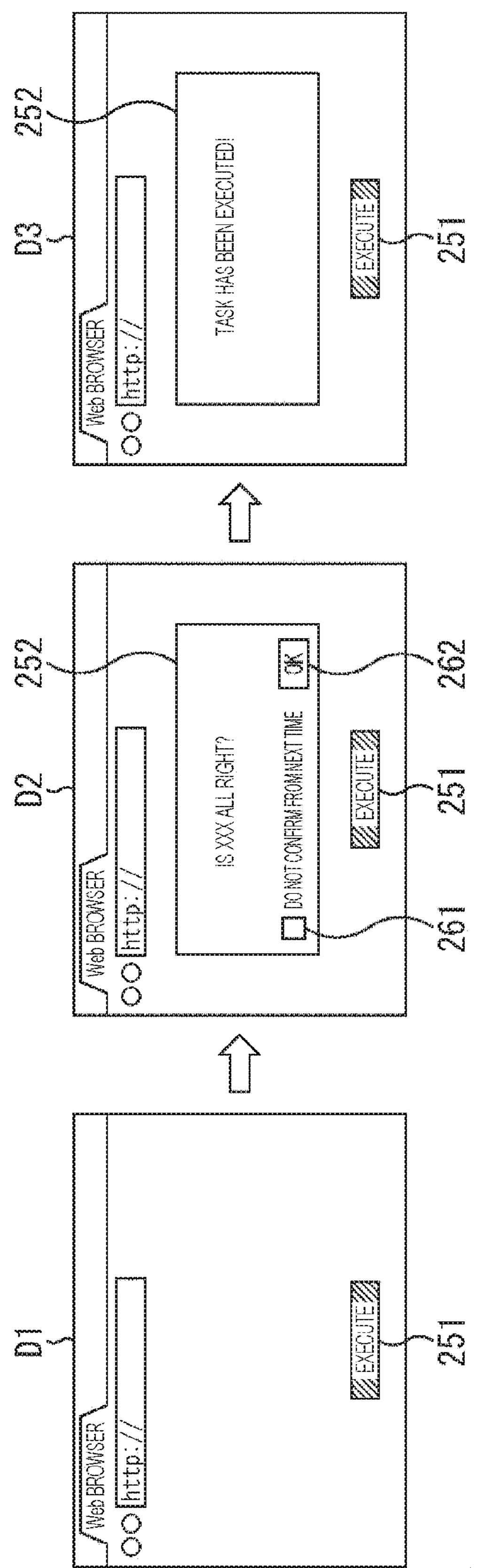
FIG. 13 is a drawing illustrating an example of screen display.

FIG. 13 is a drawing illustrating an example of screen display displayed in the display 18.

Each screen shown in FIG. 13 is a Web browser screen. In the central lower part of a screen D1 shown at the left end of FIG. 13, an Execute button 251 is displayed. The Execute button 251 is operated when execution of predetermined processing is instructed. The screen D1 is a screen displayed before a predetermined task is executed. As indicated with oblique lines, in a case where the Execute button 251 is operated, display of the display 18 is switched to a screen D2.

A dialog box 252 is displayed on the screen D2, and confirmation as to whether or not to execute a task is performed. The dialog box 252 displays a message of "Is xxx all right?"

The confirmation by the screen D2 corresponds to the above-described task execution confirmation. "xxx" is information related to contents of the task.

In the lower left of the message, a check box 261 is displayed. The check box 261 to be checked task execution confirmation is not desired to be performed from the next time. An OK button 262 is displayed in the lower right. The check box 261 of the screen D2 in FIG. 13 does not have a check mark.

In a case where the OK button 262 is pressed, the task is executed, and display of the display 18 is switched to a screen D3. The dialog box 252 of the screen D3 displays a message of "The task has been executed!", which notifies the user that the task has been executed.

In the case of this example, before the task is executed, the user is required to perform operation of pressing the OK button 262.

A difference between the allowable cost and the false execution cost is calculated as a confirmation degree, and in a case where the confirmation degree is higher than or equal to a predetermined value, the task execution confirmation is performed by the method as shown in FIG. 13.

Figure 14:
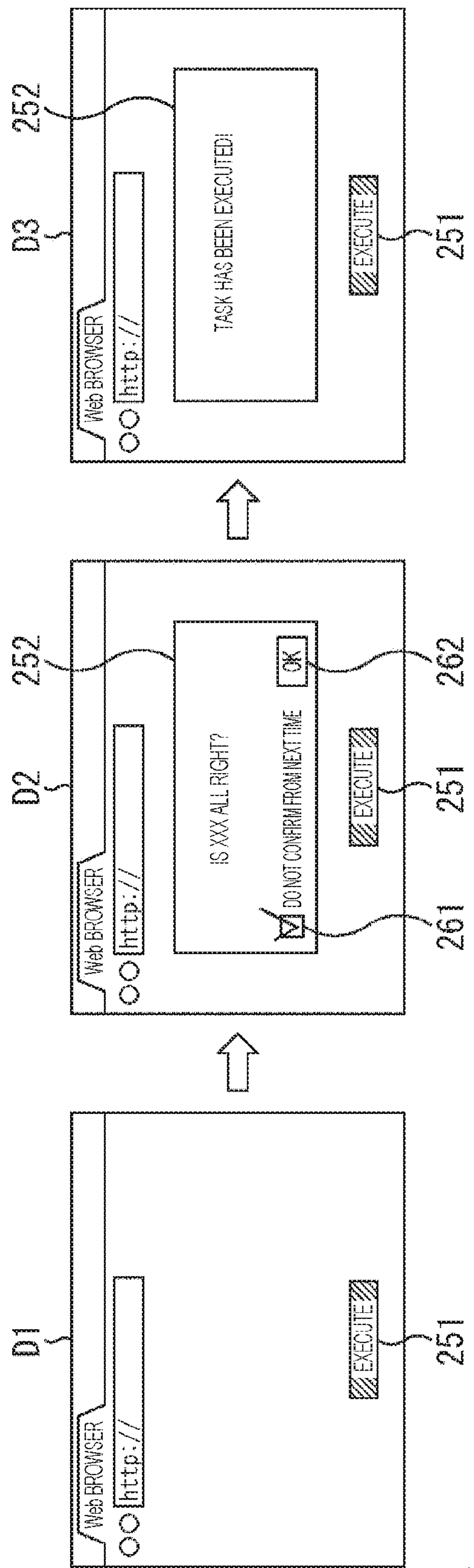
FIG. 14 is a drawing illustrating another example of screen display.

FIG. 14 is a drawing illustrating another example of screen display displayed in the display 18.

Display of the screen D1 shown at the left end of FIG. 14 is the same as that of the screen D1 in FIG. 13. In a case where the Execute button 251 is pressed, as shown in the screen D2, the dialog box 252 is displayed in a state in which the check box 261 is checked beforehand.

This is displayed, for example, when the confirmation degree is lower than that in the case of FIG. 13, in other words, when a difference between the allowable cost and the false execution cost is small. Only pressing the OK button 262 enables the user to cause the task execution confirmation not to be performed from the next time without checking the check box 261.

For example, in a case where the user makes such a reaction of pressing the OK button 262 to permit the execution of the task three times repeatedly without checking the check box 261, the allowable cost increases, and displaying of FIG. 14 is performed.

In a case where the OK button 262 is pressed, the task is executed, and display of the display 18 is switched to a screen D3.

Figure 15:
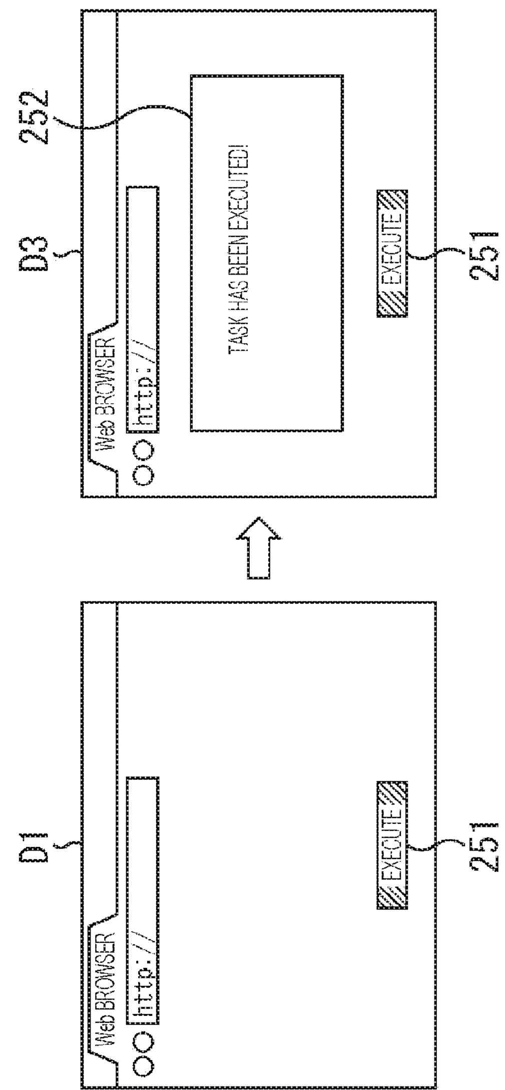
FIG. 15 is a drawing illustrating still another example of screen display.

FIG. 15 is a drawing illustrating still another example of screen display displayed in the display 18.

Display of the screen D1 shown at the left end of FIG. 15 is the same as that of the screen D1 in FIG. 13. In a case where the Execute button 251 is pressed, a screen corresponding to the screen D2 of FIGS. 13 and 14 is not displayed, and display of the display 18 is switched to the screen D3.

This is displayed, for example, when it is determined that task execution confirmation is not required because the allowable cost exceeds the false execution cost. The user is capable of executing the task with the task execution confirmation omitted.

For example, in a case where the user makes a reaction of pressing the OK button 262 to permit the execution of the task five times or more repeatedly without checking the check box 261, the allowable cost increases, and displaying of FIG. 15 is performed.

In this manner, determining the task execution confirmation method according to the confirmation degree can also be applied to a case where inputting of the execution of a task and task execution confirmation are performed by the screen UI.

<Configuration Example of Computer>

The above-described series of processing can be executed by hardware, and can also be executed by software. In a case where the series of processing is executed by software, a program that configures the software is installed in, for example, a computer built into dedicated hardware, or a general-purpose personal computer, from a program recording medium.

Figure 16:
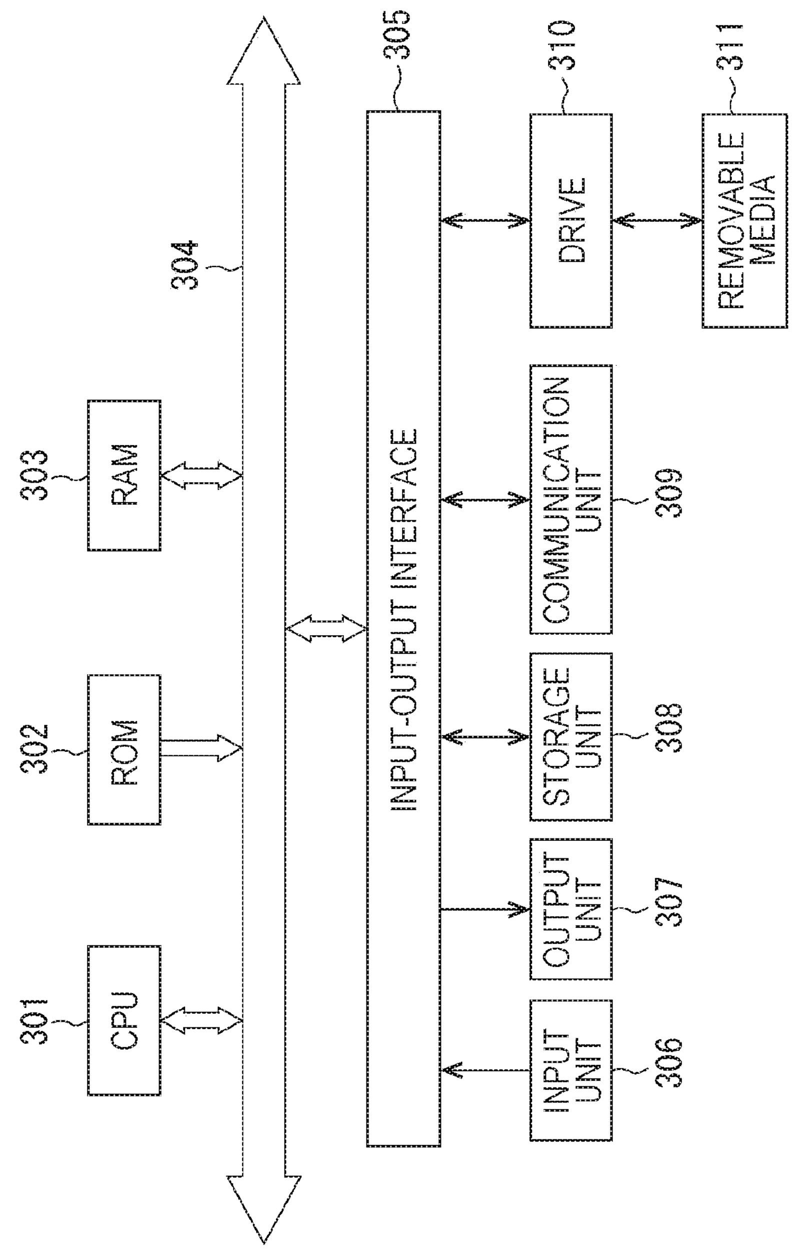
FIG. 16 is a block diagram illustrating a configuration example of a computer.

FIG. 16 is a block diagram illustrating, as an example, a hardware configuration of a computer that executes the above-described series of processing by a program.

A Central Processing Unit (CPU) 301, a Read Only Memory (ROM) 302, and a Random Access Memory (RAM) 303 are mutually connected through a bus 304.

An input-output interface 305 is further connected to the bus 304. An input unit 306 that includes a keyboard, mouse, and the like, and an output unit 307 that includes a display, a speaker, and the like are connected to the input-output interface 305. In addition, a storage unit 308 that includes a hard disk, a nonvolatile memory, and the like, a communication unit 309 that includes a network interface and the like, and a drive 310 that drives a removable media 311 are connected to the input-output interface 305.

In the computer that is configured as described above, the CPU 301 loads, for example, a program stored in the storage unit 308 into the RAM 303 through the input-output interface 305 and the bus 304, then executes the program, and consequently the above-described series of processing is performed.

The program executed by the CPU 301 is recorded on, for example, the removable media 311, or is provided through a wired or wireless transmission medium, such as a local area network, the Internet, and digital broadcasting, and is installed in the storage unit 308.

It should be noted that the program executed by the computer may be a program in which processing is time-sequentially performed along the order described in the present description, or may be a program in which processing is performed in parallel or in the required timing, for example, when a call is made.

The effects described in the present description are merely illustrative, and are not limitative, and other effects may be produced.

Embodiments of the present technology are not limited to the embodiments described above, and various modifications can be made within the scope that does not deviate from the gist of the present technology.

For example, the present technology can be configured as cloud computing in which one function is processed by being shared by a plurality of devices in cooperation through a network.

Configurations of the units shown in FIG. 11 can be partially realized in a server on the Internet.

Further, each step explained in the above-described flowchart is executed by one device. Alternatively, the each step can be executed by being shared by a plurality of devices.

Furthermore, in a case where one step includes a plurality of processings, the plurality of processings included in the one step is executed by one device. Alternatively, the plurality of processings can be executed by being shared by a plurality of devices.

<Example of Configuration Combination>

The present technology can also employ the following configurations.

(1)

An information processing device including:

a confirmation degree calculation unit that, on the basis of relationship between a first cost required in a case where execution of a predetermined task has been a mistake and a second cost that is allowed by a user for the predetermined task that has been executed by mistake, calculates a confirmation degree of confirming the user as to whether or not to execute the predetermined task; and a confirmation control unit that performs the confirmation by contents corresponding to the degree.

(2)

The information processing device set forth in the preceding (1), further including a first cost calculation unit that calculates the first cost on the basis of a type of a task and arguments used when the task is executed.

(3)

The information processing device set forth in the preceding (2), in which the first cost calculation unit calculates the first cost further on the basis of properties of the user.

(4)

The information processing device set forth in the preceding (2) or (3), in which the first cost calculation unit calculates the first cost on the basis of similarity of a combination of a type of a task and arguments used when the task is executed, between the predetermined task and a task in which a reference cost is set beforehand.

(5)

The information processing device set forth in the preceding (2) or (3), in which the first cost calculation unit calculates the first cost on the basis of tendencies of reactions by other two or more users to the confirmation.

(6)

The information processing device set forth in the preceding (2) or (3), in which the first cost calculation unit calculates the first cost represented as amount-of-money information.

(7)

The information processing device set forth in the preceding (6), in which the first cost calculation unit calculates the amount-of-money information required to change from a current situation to a situation obtained after the predetermined task has been executed.

(8)

The information processing device set forth in any of the preceding (2) to (7), further including a second cost calculation unit that calculates the second cost on the basis of a reaction of the user to the confirmation performed in the past.

(9)

The information processing device set forth in any of the preceding (1) to (8), in which the confirmation control unit performs the confirmation by requesting the user to perform input that differs according to the degree.

(10)

The information processing device set forth in any of the preceding (1) to (9), in which the confirmation control unit presents, to the user, that the predetermined task is executed by a method that differs according to the degree.

(11)

The information processing device set forth in any of the preceding (1) to (10), further including a setting unit that sets an upper limit value of the second cost on a task type basis.

(12)

The information processing device set forth in any of the preceding (1) to (11), in which the confirmation degree calculation unit adjusts the degree according to an accuracy of input by the user.

(13)

The information processing device set forth in the preceding (12), in which the confirmation degree calculation unit determines the accuracy according to a noise level.

(14)

The information processing device set forth in the preceding (12) or (13), in which the confirmation degree calculation unit determines the accuracy according to a fatigue degree of the user.

(15)

The information processing device set forth in any of the preceding (12) to (14), in which the confirmation degree calculation unit determines the accuracy according to behavior of the user.

(16)

The information processing device set forth in any of the preceding (1) to (15), in which in a case where the first cost exceeds the second cost by a threshold value or more, the confirmation control unit stops execution of the predetermined task.

(17)

The information processing device set forth in the preceding (16), in which the confirmation control unit presents, to the user, having stopped the execution of the task together with a factor.

(18)

An information processing method including the steps of:

on the basis of relationship between a first cost required in a case where execution of a predetermined task has been a mistake and a second cost that is allowed by a user for the predetermined task that has been executed by mistake, calculating a confirmation degree of confirming the user as to whether or not to execute the predetermined task; and performing the confirmation by contents corresponding to the degree.

(19)

A program for causing a computer to execute processing including the steps of:

on the basis of relationship between a first cost required in a case where execution of a predetermined task has been a mistake and a second cost that is allowed by a user for the predetermined task that has been executed by mistake, calculating a confirmation degree of confirming the user as to whether or not to execute the predetermined task; and performing the confirmation by contents corresponding to the degree.

REFERENCE SIGNS LIST

1 Information processing device
31 Voice recognition unit
32 Language analysis unit
33 False execution cost calculation unit
34 Amount-of-money calculation current value obtaining unit
35 Storage unit
36 Noise estimation unit
37 Behavior estimation unit
38 Use-log management unit
39 Confirmation degree calculation unit
40 Confirmation application execution unit
41 Application execution control unit
42 Allowable cost calculation unit
43 Allowable cost setting unit

The invention claimed is:

1. An information processing device, comprising:

circuitry configured to:

calculate a first cost based on each of a type of a specific task and arguments associated with the specific task wherein the first cost indicates a first value corresponding to false execution of the specific task;

calculate a second cost that indicates a second value corresponding to user allowance on the false execution of the specific task;

adjust the calculated second cost based on a user reaction that is same for multiple times to a specific confirmation process;

calculate a confirmation degree associated with the specific task based on the calculated first cost and the adjusted second cost;

execute a confirmation process based on contents associated with the confirmation degree, wherein the confirmation process is executed to determine user confirmation associated with the specific task, and the specific confirmation process is executed before the execution of the confirmation process; and execute the specific task based on the execution of the confirmation process.

2. The information processing device according to claim 1, wherein the circuitry is further configured to calculate the first cost based on user properties.

3. The information processing device according to claim 1, wherein the circuitry is further configured to:

calculate the first cost based on similarity between a specific combination associated with the specific task and a specific combination associated with a representative task, wherein the specific combination associated with the specific task indicates the type of the specific task and the arguments associated with the specific task, the specific combination associated with the representative task indicates a type of the representative task and arguments associated with the representative task, and the representative task has a specific reference cost.

4. The information processing device according to claim 1, wherein the circuitry is further configured to calculate the first cost based on tendencies of a plurality of user reactions to the confirmation process.

5. The information processing device according to claim 1, wherein the first cost corresponds to amount-of-money information.

6. The information processing device according to claim 5, wherein the circuitry is further configured to determine the amount-of-money information to change a current user situation to a specific user situation after the execution of the specific task.

7. The information processing device according to claim 1, wherein the circuitry is further configured to receive a user input corresponding to the user confirmation, and the user input is received based on the confirmation degree.

8. The information processing device according to claim 1, wherein the circuitry is further configured to output a notification corresponding to the user confirmation, the notification is output based on a specific method of a plurality of methods, and the specific method is selected from the plurality of methods based on the confirmation degree.

9. The information processing device according to claim 1, wherein the circuitry is further configured to set an upper limit value of the second cost based on the type of the specific task.

10. The information processing device according to claim 1, wherein the circuitry is further configured to:

receive a user input corresponding to the user confirmation; and adjust the confirmation degree based on an accuracy level associated with the user input.

11. The information processing device according to claim 10, wherein the circuitry is further configured to determine the accuracy level based on a noise level associated with the user input.

12. The information processing device according to claim 10, wherein the circuitry is further configured to determine the accuracy level based on a user fatigue degree.

13. The information processing device according to claim 10, wherein the circuitry is further configured to determine the accuracy level based on user behaviour.

14. The information processing device according to claim 1, wherein the circuitry is further configured to:

determine that the first cost is greater than the second cost by a threshold value; and stop the execution of the specific task based on the determination that the first cost is greater than the second cost by the threshold value.

15. The information processing device according to claim 14, wherein the circuitry is further configured to output a notification which indicates that the execution of the specific task is stopped, the execution of the specific task is stopped based on a specific factor, and the notification includes information of the specific factor.

16. An information processing method, comprising:

calculating a first cost based on each of a type of a specific task and arguments associated with the specific task, wherein the first cost indicates a first value corresponding to false execution of the specific task;

calculating a second cost that indicates a second value corresponding to user allowance on the false execution of the specific task;

adjusting the calculated second cost based on a user reaction that is same for multiple times to a specific confirmation process;

calculating a confirmation degree associated with the specific task based on the calculated first cost and the adjusted second cost;

executing a confirmation process based on contents associated with the confirmation degree, wherein the confirmation process is executed to determine user confirmation associated with the specific task, and the specific confirmation process is executed before the execution of the confirmation process; and executing the specific task based on the execution of the confirmation process.

17. A non-transitory computer-readable medium having stored thereon computer-executable instructions which, when executed by a computer, cause the computer to execute operations, the operations comprising:

calculating a first cost based on each of a type of a specific task and arguments associated with the specific task wherein the first cost indicates a first value corresponding to false execution of the specific task;

calculating a second cost that indicates a second value corresponding to user allowance on the false execution of the specific task;

adjusting the calculated second cost based on a user reaction that is same for multiple times to a specific confirmation process;

calculating a confirmation degree associated with the specific task based on the calculated first cost and the adjusted second cost;

executing a confirmation process based on contents associated with the confirmation degree, wherein the confirmation process is executed to determine user confirmation associated with the specific task, and the specific confirmation process is executed before the execution of the confirmation process; and executing the specific task based on the execution of the confirmation process.

* * * * *